(12) United States Patent
Katz et al.

(10) Patent No.: US 10,336,028 B1
(45) Date of Patent: Jul. 2, 2019

(54) WATERPROOF SHAPE-SHIFTING SURFACE

(71) Applicants: Andrew Jason Katz, Saint Johns, FL (US); Craig Lusk, Lutz, FL (US)

(72) Inventors: Andrew Jason Katz, Saint Johns, FL (US); Craig Lusk, Lutz, FL (US)

(73) Assignee: University of South Florida, Tampa, FL (US)

(*) Notice: Subject to any disclaimer, the term of this patent is extended or adjusted under 35 U.S.C. 154(b) by 295 days.

(21) Appl. No.: 15/222,258

(22) Filed: Jul. 28, 2016

Related U.S. Application Data

(60) Provisional application No. 62/197,912, filed on Jul. 28, 2015.

(51) Int. Cl.
 *B32B 3/06* (2006.01)
 *B32B 3/26* (2006.01)
 (Continued)

(52) U.S. Cl.
 CPC .............. *B32B 3/06* (2013.01); *B32B 3/266* (2013.01); *B32B 7/05* (2019.01); *B32B 7/08* (2013.01); *B32B 2250/04* (2013.01); *B32B 2307/7265* (2013.01); *B32B 2307/732* (2013.01); *B62D 29/04* (2013.01); *E04B 1/34* (2013.01); *E04B 1/665* (2013.01); *F16L 11/12* (2013.01)

(58) Field of Classification Search
 CPC ............. B32B 3/06; B32B 2307/7265; B32B 2307/732; B32B 2307/734
 See application file for complete search history.

(56) References Cited

U.S. PATENT DOCUMENTS

| | | | |
|---|---|---|---|
| 8,628,577 B1* | 1/2014 | Jimenez | A61F 2/447 623/17.15 |
| 2012/0234508 A1* | 9/2012 | Lusk | B25J 9/08 160/236 |
| 2016/0070254 A1* | 3/2016 | Hovsepian | B32B 3/06 428/34.1 |

OTHER PUBLICATIONS

Lusk, C., and Montalbano, P., "Design Concepts for Shape-Shifting Surfaces" in Proceedings of the 2011 Design Engineering Technical Conferences & Computers and Information in Engineering Conference, Washington, DC, Aug. 28-31, 2011. DETC2011-47402.
(Continued)

*Primary Examiner* — Scott R. Walshon
*Assistant Examiner* — Jasper Saberi
(74) *Attorney, Agent, or Firm* — Paul Murty; Nilay J. Choksi; Smith & Hopen, P.A.

(57) ABSTRACT

The first objective of this paper is to take an existing design for a shape-shifting surface (SSS) and make it waterproof, making it an effective barrier to fluid flow. The second objective is to minimize internal stresses in the device during operation, by optimizing the kinematic geometry of the SSS. The first objective was achieved by adding a waterproof membrane between the layers of the SSS, where the membrane had an origami fold pattern that enables the membrane to mimic the kinematics of the SSS. The second objective was achieved by creating a two objective optimization routine, which determined the kinematic geometry of the SSS which would minimize the internal stresses due to compression/tension of the flexure portion of the SSS during operation. The resulting SSS is easier to operate due to lower stresses, and has a membrane which prevents transverse fluid flow and mimics its motion.

18 Claims, 19 Drawing Sheets
(5 of 19 Drawing Sheet(s) Filed in Color)

(51) Int. Cl.
  *B32B 7/08* (2019.01)
  *B32B 7/05* (2019.01)
  *E04B 1/34* (2006.01)
  *E04B 1/66* (2006.01)
  *B62D 29/04* (2006.01)
  *F16L 11/12* (2006.01)

(56) References Cited

OTHER PUBLICATIONS

Zhou, Z., Wang, H., You, Z., "A Method of Designing Developable Origami Structures in Three-Dimensional Space—Part A: Mathematical Foundation" in Proceedings of the ASME 2014 International Design Engineering Technical Conferences & Computers and Information in Engineering Conference, Buffalo, New York, Aug. 17-20, 2014. DETC2014-34588.

Jin, M., Zhang, X., Zhu, B., "Design of Compliant Mechanisms Using a Pseudo-Rigid-Body Model Based Topology Optimization Method" in Proceedings of the ASME 2014 International Design Engineering Technical Conferences & Computers and Information in Engineering Conference, Buffalo, New York, Aug. 17-20, 2014. DETC2014-34325.

Zhao, K., Schmiedeler, J.P., "Using Rigid-Body Mechanism Topologies to Design Shape-Changing Compliant Mechanisms" Journal of Mechanisms and Robotics, Transactions of ASME, vol. 8, Feb. 2016.

Zirbel, S. A., Magleby, S. P., Howell, L. L., Lang, R. J., Thomson, M. W., Sigel, D. A., Walkemeyer, P. E., Trease, B. P., "Accommodating Thickness in Origami-Based Deployable Arrays" Journal of Mechanical Design, Transactions of ASME, vol. 135, Nov. 2013.

Francis, K. C., Rupert, L. T., Lang, R. J., Morgan, D. C., Magleby, S. P., Howell, L. L., "From Crease Pattern to Product: Considerations to Engineering Origami-Adapted Designs" in Proceedings of the ASME 2014 International Design Engineering Technical Conferences & Computers and Information in Engineering Conference, Buffalo, New York, Aug. 17-20, 2014. DETC-2014-34031.

Radaelli, G., Herder, J. L., "Isogeometric Shape Optimization for Compliant Mechanisms With Prescribed Load Paths" in Proceedings of the ASME 2014 International Design Engineering Technical Conferences & Computers and Information in Engineering Conference, Buffalo, New York, Aug. 17-20, 2014. DETC-2014-35373.

\* cited by examiner

WATERPROOF SHAPE-SHIFTING SURFACE

CROSS-REFERENCE TO RELATED APPLICATIONS

This nonprovisional application claims priority to U.S. Provisional Patent Application No. 62/197,912, entitled "Waterproof Shape-Shifting Surface", filed Jul. 28, 2015 by the same inventors, the entirety of which is incorporated herein by reference.

FEDERALLY SPONSORED RESEARCH OR DEVELOPMENT

This invention was made with Government support under Grant No. CMMI-1053956 awarded by the National Science Foundation. The government has certain rights in the invention.

BACKGROUND OF THE INVENTION

1. Field of the Invention

This invention relates, generally, to surfaces the shape of which can be changed in response to externally applied forces. More particularly, it relates to such surfaces that provide barriers to fluid flow that is normal thereto.

2. Description of the Prior Art

A compliant mechanism is a flexible mechanism, known to the art, that transfers an input force or displacement from one point to another through elastic body deformation. These mechanisms are most commonly designed in two ways. One is using pseudo-rigid-body models, and the other is using topology optimization. Both approaches have utility. The design of the compliant portion of the unit cell components is accomplished through compliant mechanism synthesis.

There are three major approaches to the design and synthesis of compliant mechanisms: kinematic approximation methods, computationally intense methods, and linear and higher-order expansions of the governing equations. This disclosure is based primarily upon kinematic approximation methods.

The kinematic approximation or Pseudo-Rigid-Body Model (PRBM) approach works by identifying similarities between compliant mechanisms and rigid-body mechanisms. It has proved effective in identifying numerous compliant analogues to ubiquitous planar rigid-body mechanisms such as four-bar and crank-slider mechanisms. The chief criticisms of this approach are that the models are approximate and have limited, albeit known, accuracy. Moreover, the identification between flexure geometries and rigid-body mechanisms has been limited to a small but versatile set of planar configurations.

Computationally intense approaches typically combine finite element analysis with optimization to calculate optimal geometries in response to load and motion specifications. This approach has been successful, but has also been criticized for producing results identical to those produced more quickly by the PRBM approach, or results that are not physically realizable. As a general rule, this approach is more capable and accurate than the PRBM approach, but also more time consuming.

The third approach, which relies on linear and higher-order expansions of the governing equations, is well-known in precision mechanisms research, and relies heavily on flexures that are small and undergo small, nearly linear, deflections. This approach uses flexures much smaller than the overall mechanism size, so it is not generally applicable to millimeter-scale and smaller mechanisms. These techniques are important but do not have a direct bearing on the invention disclosed herein.

Systems for subdividing surfaces in the development of finite element algorithms using node definition and degrees of freedom are known. These same subdivisions schemes are applicable to the design of the novel shape-shifting surfaces disclosed hereinafter. The prior art includes techniques for node placement in a given shape. For example, in Finite Element models, the behavior between nodes is typically determined by interpolating functions. Methods for enumerating all possible kinematic linkages with a given number of degrees of freedom are known. The simplest systems satisfying degree of freedom requirements are preferred. For example, triangular elements with additional nodes along the edges and center-point nodes are known.

Tiling systems, periodic and aperiodic, are methods for subdividing surfaces and as such have been extensively studied by mathematicians and artists since antiquity. The three regular tilings are: 1) equilateral triangles only, 2) squares only, and 3) regular hexagons only. There are eight Archimedian tilings, and there are aperiodic Penrose kite-and-dart tiling systems. The regular tilings are simple and require the fewest different types of unit cells. Some of the Archimedian tilings use polygons with several sides, yielding generous angles and areas to work with, which may be advantageous. Penrose tiles are specifically shaped quadrilaterals that can be assembled in multiple, non-periodic ways.

Certain barriers or surfaces do exist, for example U.S. Pat. No. 5,348,791 to Thompson et al.; U.S. Pat. No. 6,712,414 to Morrow; U.S. Pat. No. 8,402,711 to Lusk; U.S. Pat. No. 8,424,265 to Lusk; U.S. Pat. No. 8,689,514 to Sternowski. However, none of the foregoing devices provide for effective, waterproof shape-shifting surfaces that can be linked to one another.

In 1827, Carl Fredrich Gauss published his 'Theorema Egregium' which is the foundational result in differential geometry. The basic result is that small triangles do not change their shape when bent and that there is a fundamental difference in the shape of triangles that are planar (the sum of the angles is equal to 180 degrees) and the shape of triangles on a sphere (the sum of the angles is always more than 180 degrees) and the shape of triangles on a hyperbolic or saddle-shaped surface (the sum of the angles is always less than 180 degrees). His result means that spheres cannot be made into planes without crumpling or tearing or stretching (distorting) the surface. This fundamental geometric limitation makes the building of certain types of curved surfaces (those with two non-zero principal curvatures) intrinsically more difficult than working with planar surfaces (both principal curvatures equal to zero) or developable surfaces (one principal curvature equal to zero).

A surface is defined as a material layer constituting such a boundary. Examples of this are walls, ceilings, doors, tables, armor, vehicle bodies, etc. However, in some cases, it may be valuable for these surfaces to change shape while still maintaining rigidity in the direction normal to the surface. In addition, having surfaces able to change between two different sizes on demand and potentially even stabilize in those sizes may be of even more value. One valuable application of size changing surfaces may be rigid containers, for example milk crates, trash barrels, dumpsters, laundry baskets, suit cases, truck beds, freight trains, trash compactors, etc. Such containers are designed for large volumes, however, when not in use, may become cumbersome. Thus, containers with large volumes when in use and small volumes when empty are of value. This includes the ability for containers to maintain large or small sizes both when in use and when empty.

This leads to a need for innovation that allows conventional surfaces to achieve new functionality, to be constructed more precisely, or at lower cost. In addition to potential savings when a new barrier is erected, an innovative system would provide new methods and functionality to surfaces and objects.

Objects that function as physical barriers or supporting surfaces include walls, table tops, shelves, floors, ceilings, stairs, vehicle bodies, and pipelines. Conventional methods for constructing these barriers can be costly, but even when they are inexpensive, the numbers of these kinds of objects mean that they represent a significant economic investment. Such barriers often incur additional costs when they require modification or removal.

Accordingly, what is needed is an improved barrier between two fluids, such as oil and water or water and air, where the surface of the barrier can be modified or adjusted without damaging the surface or rebuilding it. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved shape-shifting surface is now met by a new, useful, and nonobvious invention.

In an embodiment, the current invention is a fluid-blocking, shape-shifting surface, comprising at least one unit cell including a plurality of layered, adjacent, overlapping compliant links, combined with a flexible fluid-blocking membrane. Each compliant link includes a shield component and a compliant flexure, where the shield component is a substantially flat plate with a node disposed therein and the flexure includes links, joints, and a node disposed therein. The flexure node has two positions within a line of action, where the node travels substantially linearly between these two positions. The compliant links are joined together at the nodes and are pivotal about the nodes, such that the shield components form a contiguous line of sight barrier in the two positions of the compliant links. The flexible membrane is disposed between at least two layers of the compliant links within the cell, where the membrane is structured to have similar kinematics as the cell during manipulation (e.g., expansion up to about four thirds the original size, compression up to about two thirds the original size, shearing up to a rotation of about 30° at a node) of the cell. The membrane is a barrier to fluid flow normal to the membrane surface.

The unit cells may include four (4) compliant links that are coupled to each other at 90° angles to form a parallelogram-shaped structure. In this case, the shield node of one compliant link would be coupled to the flexure node of an adjacent compliant node, until all four (4) compliant links were coupled together and would move in unison along the line of action.

Each flexure may be approximately parabolically shaped and/or have a first end connected to the corresponding shield component, and a second end that is a free end. In a further embodiment, the flexure node can be disposed in the free end of the compliant link.

Now referring to the flexible membrane, the membrane may include edge segments disposed at the edges of the unit cell, corner segments disposed at the corners of the unit cell, and a center segment disposed between the edge segments and corner segments. In this way, the edge segments permit compression and expansion of the unit cell, the corner segments permit shearing of the unit cell (by allowing for acute and obtuse angles at each corner of the unit cell), and the center segment provides a contiguous surface in the middle of the unit cell. In a further embodiment, the edge segments and corner segments may be connected to each other in series around a perimeter of the unit cell, and the center segment would be connected to the edge segments and corner segments.

In another embodiment, the membrane may have an origami fold pattern that facilitates the membrane having similar kinematics to the unit cell. Further, the origami fold pattern may include underlaying edge folds in the edge segments and underlaying corner folds in the corner segments, such that the underlaying edge folds unfold and fill gaps created during expansion of the unit cell and at least two (2) of the underlaying corner folds unfold and fill gaps created during shearing of the unit cell. Still further, the origami fold pattern may also include a diamond fold in the center segment, where the diamond fold also includes perpendicular interwoven folds therein.

Optionally, the waterproof shape-shifting surface (SSS) may further include pop rivets disposed through at least one of the compliant links, where the flexible membrane would be coupled to the compliant link using those pop rivets.

In a separate embodiment, the current invention is a waterproof, shape-shifting surface, comprising any one or more—or even all—of the foregoing characteristics and features.

In yet another embodiment, the current invention is a fluid-blocking, shape-shifting polyhedron comprising a polygonal cell including a plurality of unit cells. Each unit cell can have any one or more—or even all—of the foregoing characteristics and features.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

The current invention improves upon U.S. Pat. Nos. 8,402,711 and 8,424,265 to Lusk, both of which are incorporated herein by reference in their entireties. The main improvement over these references is to provide waterproof capability through an improved structure of each unit cell and the system as a whole.

Figure 1A:
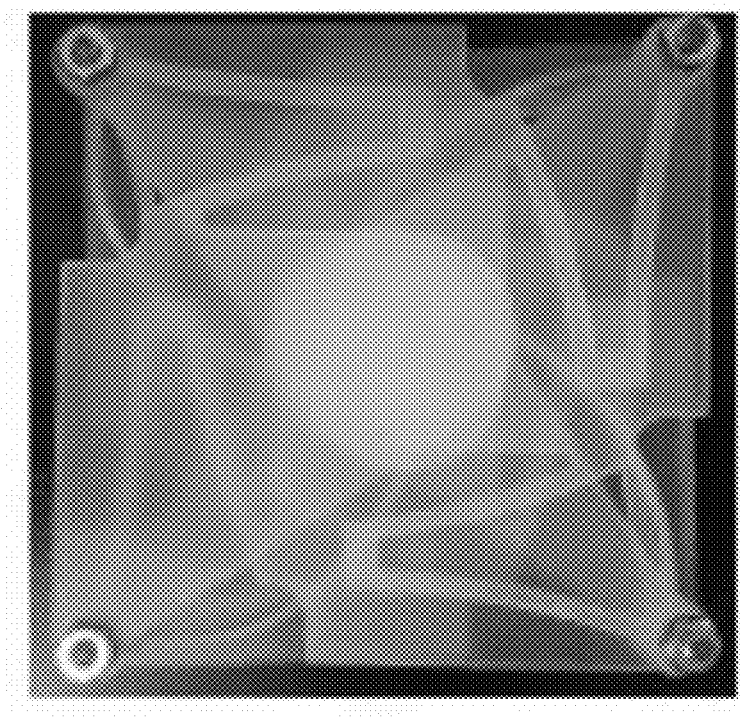
FIG. 1A depicts a unit cell, according an embodiment of the current invention, in an equilibrium position.
Figure 1B:
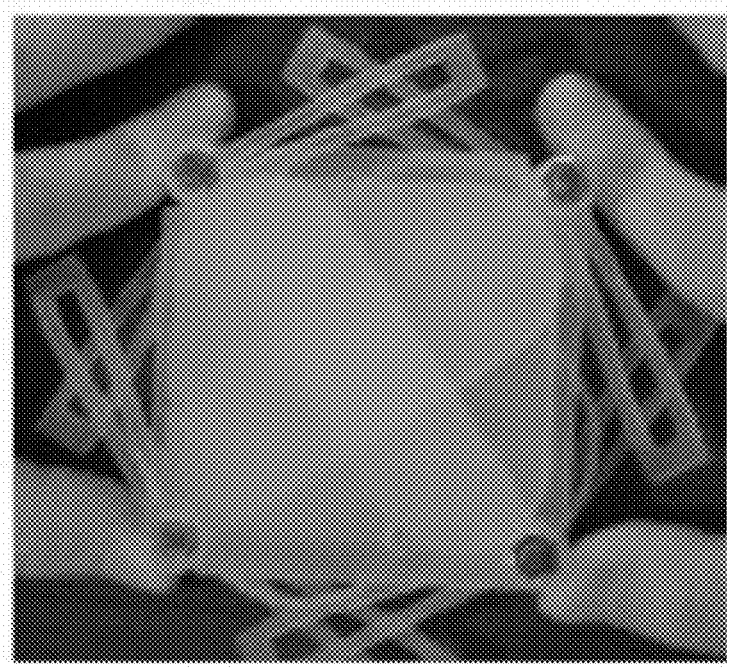
FIG. 1B depicts a unit cell, according an embodiment of the current invention, in a compressed position.
Figure 1C:
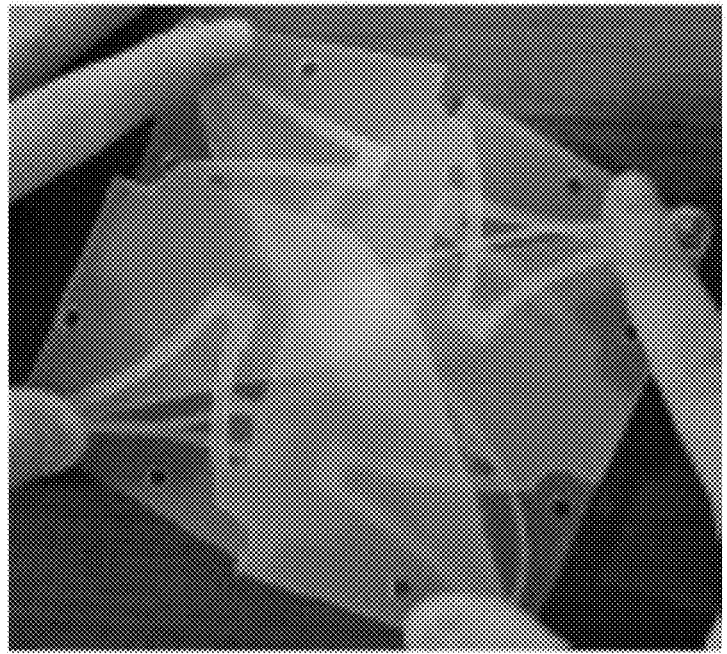
FIG. 1C depicts a unit cell, according an embodiment of the current invention, in tension.
Figure 1D:
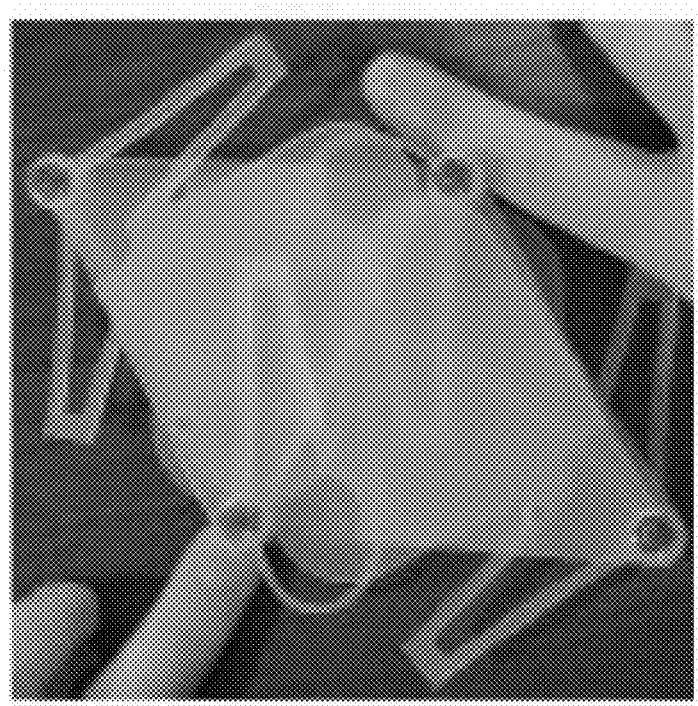
FIG. 1D depicts a unit cell, according an embodiment of the current invention, in shear.

An object of the current invention is to design and optimize a waterproof shape-shifting surface (SSS). An SSS [Montalbano, P., Lusk, C., 2011, "Design Concepts for Shape-Shifting Surfaces" in Proceedings of the ASME 2011 International Design Engineering Technical Conferences & Computers and Information in Engineering Conference, Washington, D.C., Aug. 29-31, 2011. DETC2011-47402] is a surface which maintains its effectiveness as a physical barrier while changing its shape. One way of achieving this is using arrays of multilayered compliant links to form a unit cell, which is an SSS in and of itself but also can be layered or configured to form a larger shape-shifting structure or polyhedron. In an embodiment, the current invention is a unit cell, which is a square that can compress to two-thirds of its original size, expand in tension to four-thirds of its original size, or shear +/−30 degrees at each corner while maintaining integrity. Compression or expansion can occur in the X and/or Y direction(s). Previous designs (such as U.S. Pat. Nos. 8,402,711 and 8,424,265) acted as "line-of-sight" barriers but had gaps which would allow for fluid flow between layers [Montalbano, P., Lusk, C., 2011, "Design Concepts for Shape-Shifting Surfaces" in Proceedings of the ASME 2011 International Design Engineering Technical Conferences & Computers and Information in Engineering Conference, Washington, D.C., Aug. 29-31, 2011. DETC2011-47402]. FIG. 1A shows the unit cell, according to an embodiment of the current invention, in an equilibrium position, and FIGS. 1B-1D show the unit cell in compression, tension, and shear, respectively.

A waterproof SSS's benefit would lie in its ability to preserve structural integrity in the surface's normal direction, while also permitting co-planar shape change in the surface. This stiffness anisotropy (flexible in-plane, stiff normal to the plane) is provided by the SSS's geometry and is in contrast to the typical behavior of isotropic homogeneous surfaces, which are typically much stiffer in-plane. A goal was to combine the structural integrity of a SSS with the watertight seal of a flexible polymeric sheet to create a surface which would be strong, flexible, and waterproof.

An object in the development of the current SSS was to make the unit cell waterproof, i.e., an effective barrier to fluid flow normal to the surface. Another object in the development of the current SSS was to optimize the geometry of the compliant link to minimize internal stresses when each unit cell deforms. The device was made waterproof by adding a thin flexible membrane between the layers. The membrane was designed to have an origami fold pattern which would allow it to have the same kinematics as the device. The structural integrity was improved by creating an optimization routine that minimized internal stress when the device is actuated.

In application, certain embodiments of the waterproof SSS could have use in the maritime and medical industries. In the maritime industry, for example, the device could serve to prevent spilled fluid, such as oil from spreading further into a body of water. In the medical industry, for example, it could act as a sterile barrier either to protect caregivers from a quarantined patient, or to protect immuno-compromised patients from infection. In these applications, such surfaces may have advantages of allowing greater ranges of motion or greater energy absorption capability (stored elastic potential in compliant members) than existing surfaces, which could be important in dealing with fluids under pressure.

Figure 2:
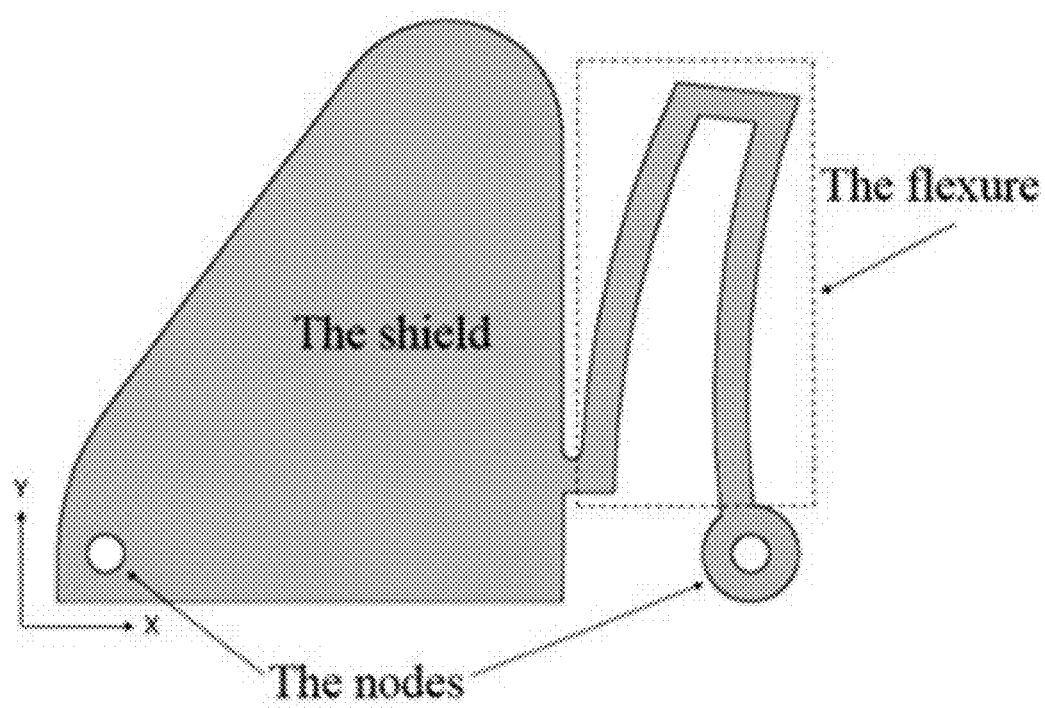
FIG. 2 is an example of the initial link design.

Generally, each SSS is formed of a plurality of compliant links that are each an individual or self-contained component of the unit cell; an example of a compliant link is shown in FIG. 2, including a shield component, a flexure component, and a plurality of nodes, where the figure also illustrates the coordinate system orientation. Each unit cell includes multiple compliant links oriented at ninety degrees from one another and bound at the nodes (see FIGS. 1A-1D). The out-of-the-page direction is aligned with the Z-axis. When two unit cells are adjacent to one another, the unit cell shown in FIG. 2 would be adjacent to a similar unit cell with a mirrored orientation. When two unit cells are disposed in such a manner, they can be individual, they can be hinged (or connected), or they can be fused. When the unit cells are fused, compression and tension in the flexure occurs if the path of the node is not a straight line in the x-direction. Thus, the kinematics of the moving node are a significant determiner of the maximum stresses seen as the flexure deflects.

The initial design of the SSS is described in [U.S. Pat. No. 8,402,711; Montalbano, P., Lusk, C., 2011, "Design Concepts for Shape-Shifting Surfaces" in Proceedings of the ASME 2011 International Design Engineering Technical Conferences & Computers and Information in Engineering Conference, Washington, D.C., Aug. 29-31, 2011. DETC2011-47402]. A PRBM was used to represent the compliant link as a system of rigid links connected by torsional springs. The PRBM is a methodology of modeling a compliant mechanism with an effective degree of accuracy when large deflections are going to occur. When a device is going to undergo small deflections, the small angle approximation can be used, where sin (θθ)≅θθ. The method used herein was the PRBM, where compliant segments are modeled as two rigid members connected by a torsional spring.

Solid mechanics theory was used to analyze the behavior of the part using the virtual work method. Together, these theories (PRBM and solid mechanics) form the basis for the optimization objective of the development of the current SSS—aiming to reduce stress in the flexure by improving its kinematics (i.e., making its motion more nearly straight-line in the x-direction).

The principle of virtual work involves using a virtual deflection of a member to measure the amount of work done in order to make a member deflect. This permits calculation of the change in potential energy of a series of springs (such as the ones used in the PRBM).

Kinematic Optimization

Figure 3:
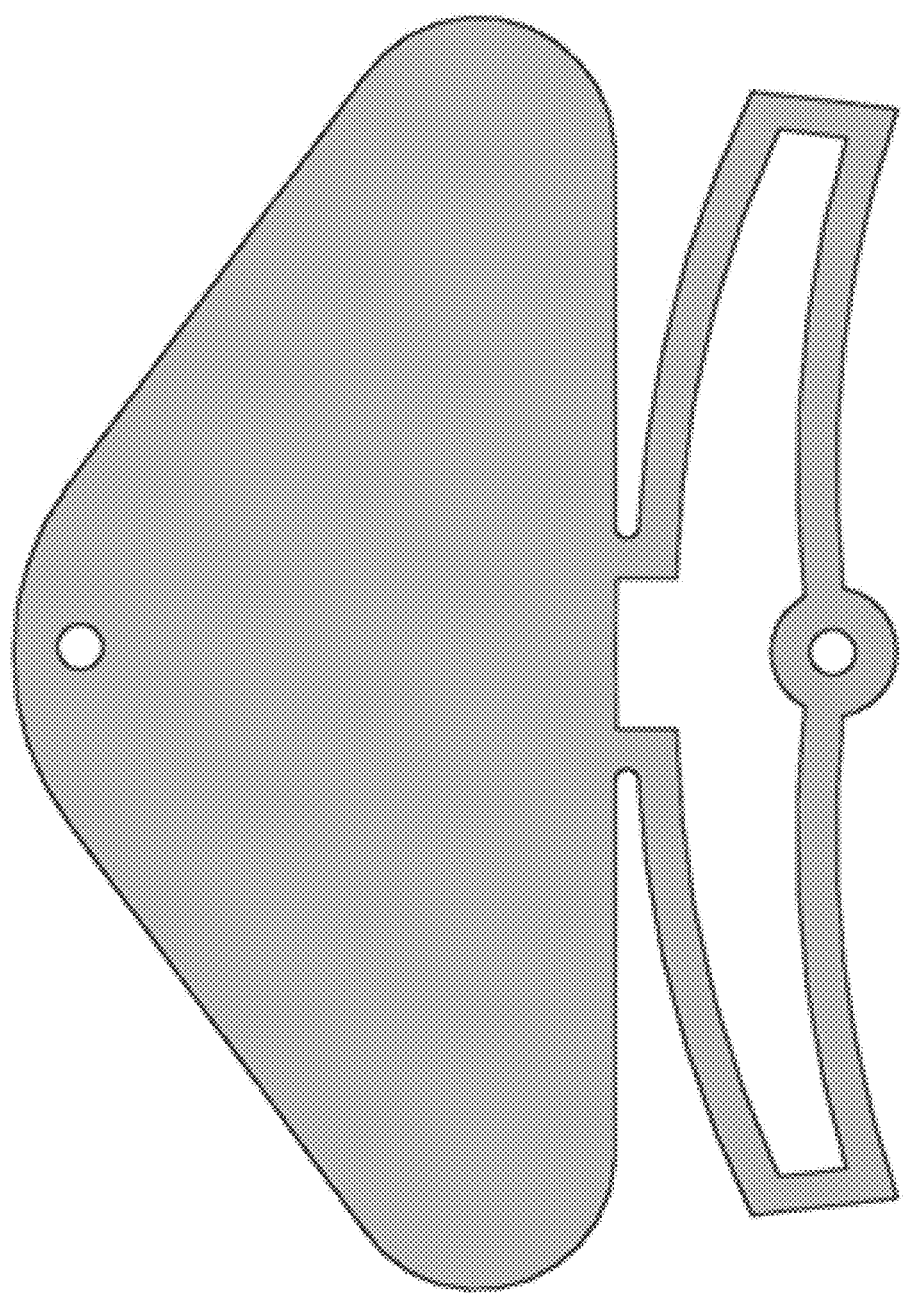
FIG. 3 is an example of the double-size initial component.

When the unit cell is compressed or expanded, the node attached to the compliant arm (flexure) tends to move in an arc-shaped path, as also discussed in U.S. Pat. No. 8,402, 711. This indicates that in the double-size version (FIG. 3), when the arm is forced to move in a straight line, there will be internal stresses in the compliant arm associated with it moving along a different path. Optimizing the kinematics of the compliant link, making its motion tend to a straight line, minimizes these internal stresses, thus making a more efficient design. The optimization was based on the initial model shown in FIG. 4.

Figure 4:
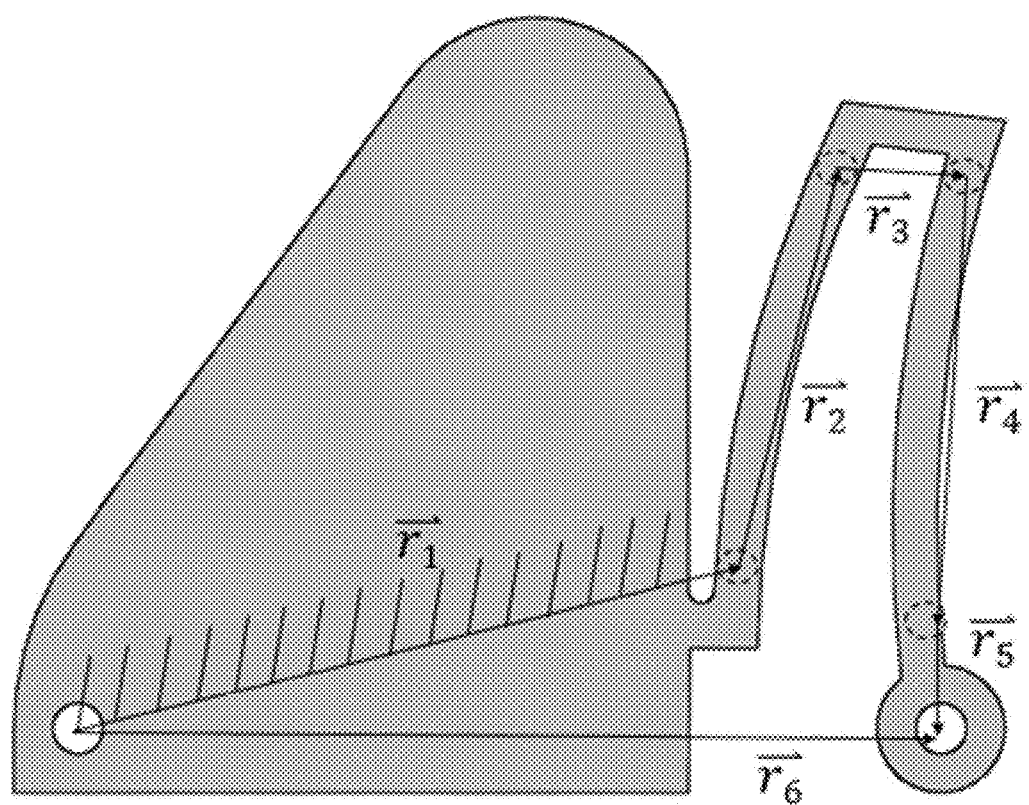
FIG. 4 is a vector loop of the pseudo-rigid body model of the compliant link.

To begin the optimization, a PRBM of the compliant link was constructed, and a vector loop was drawn, as shown in FIG. 4. The dotted circles at the tips of vectors $\vec{r}_1$, $\vec{r}_2$, $\vec{r}_3$, and $\vec{r}_4$ indicate the positions of the torsional springs in the PRBM. The original compliant link was designed with curved flexures. The scope of this initial design did not include an analysis to determine the optimal curvature of the vectors within the compliant link. For this reason, the original compliant link had curved flexures; however, the analysis and optimization are based on straight flexures.

The vector loop equation in the x-direction is:

$$r_1 \cos \theta_{10} + r_2 \cos \theta_{20} + r_3 \cos \theta_{30} + r_4 \cos \theta_{40} + r_5 \cos \theta_{50} = 1 \quad (1)$$

and the vector loop equation in the y-direction is:

$$r_1 \sin \theta_{10} + r_2 \sin \theta_{20} + r_3 \sin \theta_{30} + r_4 \sin \theta_{40} + r_5 \sin \theta_{50} = 0 \quad (2)$$

where $r_{1-5}$ are the lengths of each link of the vectors, and the thetas are the initial angles of the members, measured counter-clockwise positive from the x-axis, at the tail of the respective vectors. The optimization variables are the position coordinates $x_1$, $x_2$, $x_3$, $y_1$, $y_2$, $y_3$, and $y_4$. $x_4$ and $x_5$ are constant so that $\vec{r}_5$ remains vertical, this was done because the compression of $\vec{r}_5$ is directly proportional to the internal stress in the flexure when it is actuated. $y_5$ is constant so that $\vec{r}_6$ remains horizontal, this was done to keep the unit cell square. The coordinates are the tips of their respective vectors. The virtual work is then calculated using the equation:

$$\vec{F}_y \cdot \delta \vec{z}_2 + \vec{F}_x \cdot \delta \vec{z}_1 - \Sigma \frac{\delta V}{\delta q_i} \delta q_i = 0 \quad (3)$$

where $\vec{F}_x$ is the applied force which contributes to expansion or compression of the unit cell, and $\vec{F}_y$ is the internal force that causes tension or compression in the double-size version. The $d\vec{z}$ vectors are displacement vectors, V is potential energy from springs, and the q variables are the generalized position coordinates.

$$q_1 = r_6 \quad (1)$$

$$q_2 = r_5 \quad (2)$$

$$q_3 = \theta_2 \quad (3)$$

$$\vec{z}_1 = r_6 \quad (4)$$

$$\vec{z}_2 = r_6 + i r_5 \quad (5)$$

$$\delta \vec{z}_1 = \delta r_6 \quad (6)$$

$$\delta \vec{z}_2 = \delta r_6 + i \delta r_5 \quad (7)$$

Vector $r_6$ remains horizontal, and fixed at the tail. The compliance of the members is modeled by the aforementioned torsional springs located at the tips of $\vec{r}_1$, $\vec{r}_2$, $\vec{r}_3$, and $\vec{r}_4$. The equation for the potential energy in all of the torsional springs is then:

$$V = \frac{1}{2}K_2\Psi_2^2 + \frac{1}{2}K_3\Psi_3^2 + \frac{1}{2}K_4\Psi_4^2 + \frac{1}{2}K_5\Psi_5^2 \quad (11)$$

where the K variables are the spring constants of the torsional springs, and $$\Psi_2 = (\theta_2 - \theta_{20}) - (\theta_1 - \theta_{10}) \quad (8)$$

$$\Psi_3 = (\theta_3 - \theta_{30}) - (\theta_2 - \theta_{20}) \quad (9)$$

$$\Psi_4 = (\theta_4 - \theta_{40}) - (\theta_3 - \theta_{30}) \quad (10)$$

$$\Psi_5 = (\theta_5 - \theta_{50}) - (\theta_4 - \theta_{40}). \quad (11)$$

To solve equation 3, it is first written using each of the three q variables. Equation 11 is then differentiated with respect to each of the three q variables so that it can be plugged into equation 3. The results are:

$$F_x = \frac{dV}{dr_6} \quad (12)$$

$$F_y = \frac{dV}{dr_5} \quad (13)$$

$$\frac{dV}{d\theta_2} = 0 \quad (14)$$

$$\frac{dV}{dr_6} = k_3\Psi_3\frac{d\Psi_3}{dr_6} + k_4\Psi_4\frac{d\Psi_4}{dr_6} + k_5\Psi_5\frac{d\Psi_5}{dr_6} \quad (15)$$

To solve equations 16-19, kinematic equations are used to find expressions for $$\frac{dV}{dr_6}, \frac{dV}{dr_5}, \text{ and } \frac{dV}{d\theta_2}.$$

Equations 1 and 2 are used in complex form:

$$\vec{x} = r_1 e^{i\theta_{10}} + r_2 e^{i\theta_2} + r_3 e^{i\theta_3} + r_4 e^{i\theta_4} + r_5 e^{i\theta_5} \quad (20)$$

Equation 20 is then differentiated with respect to $r_6$ and rearranged to yield:

$$\frac{d\theta_4}{dr_6} = \frac{\cos\theta_3}{r_4 \sin(\theta_4 - \theta_3)} \quad (21)$$

The same process can then be applied to solve for $$\frac{d\theta_3}{dr_6}.$$

Once those coefficients have been obtained, the final equation for this part of the calculations is produced:

$$F_x = \quad (22)$$
$$\frac{1}{\sin(\theta_3 - \theta_4)}\left[\frac{-k_3\Psi_3\cos\theta_4}{r_3} + \frac{k_4\Psi_4\cos\theta_3}{r_4} + \frac{k_4\Psi_4\cos\theta_4}{r_3} + \frac{k_5\Psi_5\cos\theta_3}{r_4}\right]$$

The same process is then used to solve for $F_y$ and $$\frac{dV}{d\theta_2}.$$

Once these equations have been solved they become the basis for the optimization program.

$$F_y = \frac{1}{\sin(\theta_3 - \theta_4)}\left[\frac{k_3\Psi_3}{r_3}\cos(\theta_5 - \theta_4) - \right. \quad (23)$$
$$\left. k_4\Psi_4\left(\frac{\cos(\theta_5 - \theta_3)}{r_4} + \frac{\cos(\theta_5 - \theta_4)}{r_3}\right) - \frac{k_5\Psi_5}{r_4}\cos(\theta_5 - \theta_3)\right]$$

$$\frac{dV}{d\theta_2} = k_2\Psi_2 + k_3\Psi_3\left[\frac{-r_2\sin(\theta_2 - \theta_4)}{r_3\sin(\theta_3 - \theta_4)} - 1\right] + \left[\frac{-k_4\Psi_4 r_2\sin(\theta_2 - \theta_3)}{r_4\sin(\theta_4 - \theta_3)}\right] + \quad (24)$$
$$\left[\frac{k_4\Psi_4 r_2\sin(\theta_2 - \theta_4)}{r_3\sin(\theta_3 - \theta_4)}\right] + \left[\frac{-k_5\Psi_5 r_2\sin(\theta_2 - \theta_3)}{r_4\sin(\theta_4 - \theta_3)}\right] = 0$$

An optimization program was written in MATLAB® and works in two phases. In the first phase, it solves for five unknown variables using five equations. The five equations are equations 1, 2, and 22-24. The five unknown variables are $F_x$, $F_y$, $\theta_2$, $\theta_3$, and $\theta_4$. This routine solves the equations using the fsolve command, a gradient-based optimization which searches for the root(s) of a system of equations. The initial guess values were based on an existing prototype of the compliant link. The unknowns are found for the feasible range of input values of $r_6$. The most important output of the first phase of the program is the maximum force experienced in the Y-direction (the internal stress metric).

The second phase of the optimization uses the fmincon command (a gradient-based optimization routine) to minimizing the maximum force experienced by the compliant arm in the Y-direction. In this phase, the program repositions the coordinates that form the members of the pseudo-rigid-body model, then re-determines the maximum force in the Y-direction. It repeats this process, searching for coordinate values which minimize the force in the Y-direction. The stopping criteria for the function value is $10^{-6}$ (i.e., practically zero). The following are the constraints of the program:

1. The beginning and end of the vector loop cannot change position. As such, the tail of $\vec{r_1}$ and the tip of $\vec{r_5}$ do not change position, and $\vec{r_6}$ remains horizontal.
2. Vector $\vec{r_5}$ remains vertical. This is based on the symmetry of the double-size model.

In order to ensure that the solution which the program found was the best solution, several forms of the optimization were run. First, a gradient-based routine (fmincon) with initial values taken from an existing prototype was used, then Multi Start (MS) and Global Search (GS) optimizations were also run, which also use the fmincon routine, but have different methods for generating initial values. The fmincon optimization uses a prescribed set of initial values to plug into the objective function. The MultiStart routine generates a defined number of sets of initial values randomly, then runs each of them, searching for the optima, the MultiStart used in this program used twenty sets of initial values. The GlobalSearch (GS) routine starts with a prescribed set of initial values, then generates additional sets of initial values using a scoring system to determine which initial values are most likely to give optimal results. The Global Search routine found the solution which was determined to be the best. This determination was based on the objective function value. The coordinates, which the program determined were optimal, formed the basis for the new designs of the compliant link.

Optimization Results

The output of the optimization program was a set of coordinates that form a vector loop. The coordinates have been converted to vector form and are shown in Table 1.

TABLE 1

Optimized vectors.

| Vector | Initial Design Length (mm) | Initial Design Angle (°) | GSO Length (mm) | GSO Angle (°) | STO Length (mm) | STO Angle (°) |
|---|---|---|---|---|---|---|
| $\vec{r}_1$ | 60.87 | 15.78 | 63.37 | 13.82 | 86.25 | 38.21 |
| $\vec{r}_2$ | 33.99 | 75.10 | 38.86 | 90.00 | 64.60 | 74.95 |
| $\vec{r}_3$ | 11.02 | −14.67 | 16.51 | −38.87 | 16.51 | −0.02 |
| $\vec{r}_4$ | 28.34 | −90.00 | 25.71 | −90.00 | 60.67 | −90.00 |
| $\vec{r}_5$ | 18.27 | −90.00 | 17.93 | −90.00 | 0.10 | −90.00 |
| $\vec{r}_6$ | 77.02 | 0.00 | 77.02 | 0.00 | 74.40 | 0.00 |

The width of the flexures was in part determined by the feasibility of the laser cutting machine being used for fabrication; thinner flexures were used to reduce stiffness. In Table 1 and Table 2, GSO indicates the Global Search Optimized compliant link, and SIO indicates the Simple Optimized compliant link.

Figure 5:
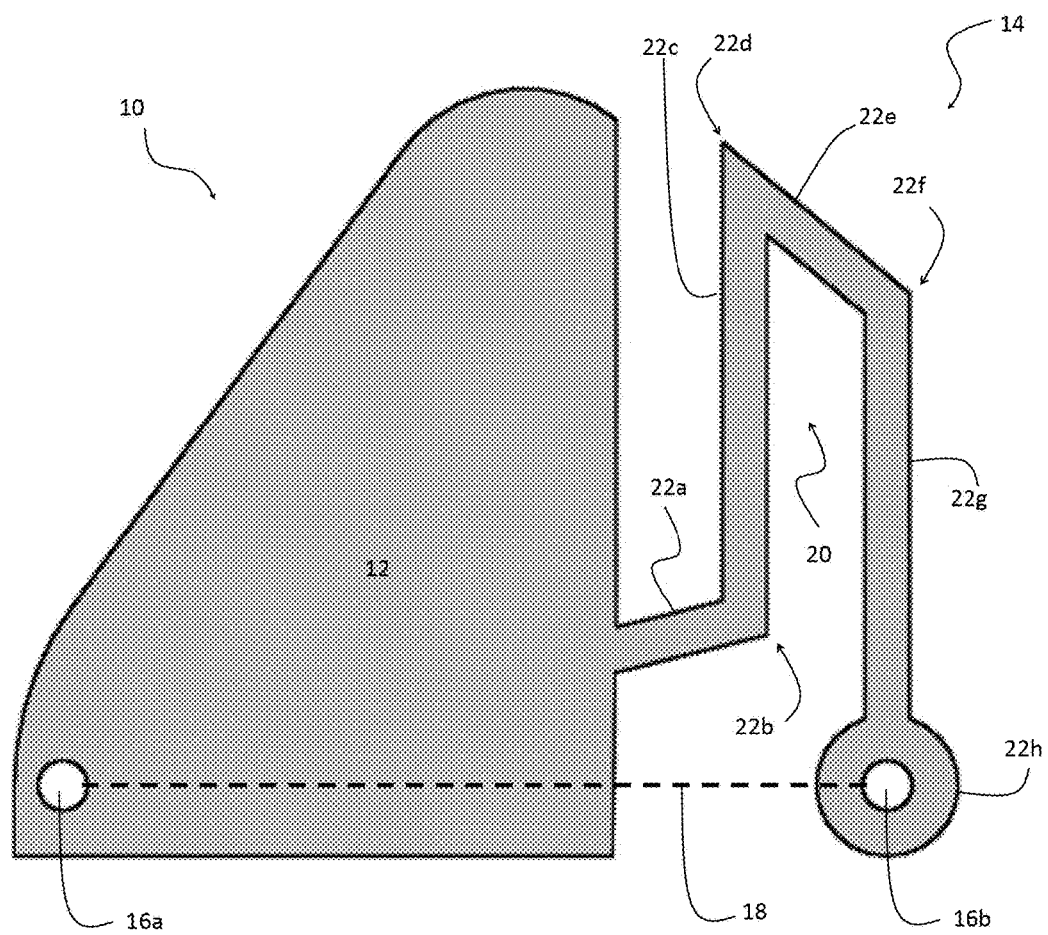
FIG. 5 depicts the optimized compliant link, according to an embodiment of the current invention.

The loop is then interpreted to form a three-dimensional iteration. The optimized version of the compliant link is shown in FIG. 5. Comparing FIGS. 4 and 5 shows that changing the geometry of the flexure of the compliant link would reduce the internal stresses during operation.

Still referring to FIG. 5, the compliant link, generally denoted by the reference numeral 10, includes shield component 12, flexure 14, node 16a disposed in shield component 12, and node 16b disposed in the "free" end of flexure 14. Nodes 16a, 16b are horizontally aligned (or otherwise aligned along an axis or line, denoted by reference numeral 18). Flexure 14 has a generally parabolic shape, indicated by reference numeral 20, disposed therein, which permits movement of the free end of flexure 14. Flexure 14 further can be formed of structures 22a-22e and follow a path of travel from a connection to shield component 12 on one end and node 16b on an opposite end. Link 22a is coupled to shield component 12, link 22c is coupled to link 22a through joint 22b, link 22e is coupled to link 22c through joint 22d, and link 22g is coupled to link 22c through joint 22f. Flexure 14 finally terminates on its free end at node frame 22h with node 16b disposed therein.

In an embodiment, a plurality of compliant link 10 is layered on each other at about 90° angles relative to each other, similar to that seen in FIG. 1A. In this way, the resulting unit cell can expand, compress, and shear, as seen in FIGS. 1B-1D, respectively.

Finite Element Analysis (FEA) performed using SOLID-WORKS showed a 22.91% reduction in the maximum Von Mises stress experienced by the compliant link during operation, as can be seen in Table 2. This analysis used polypropylene copolymer as the material. All FEA results are based on the double-size model because the double-size model was expected to experience higher stresses.

TABLE 2

Results from FEA and optimization.

| Design | Max Von Mises Stress (MPa) from FEA | Difference | Objective Function Value (N) |
|---|---|---|---|
| Initial | 17.9 | N/A | N/A |
| GSO | 13.8 | −22.91% | 10.29 |
| SIO | Did not do FEA | N/A | 21.83 |

Origami Study

The optimized unit cell, according to certain embodiments of the current invention, was made waterproof by adding a thin flexible membrane between the layers of compliant links. The membrane was designed to have an origami fold pattern, which would allow it to have the same kinematics as the device. Optimization of this pattern of the flexible membrane is described herein.

Previous papers have analyzed methods for synthesizing origami patterns for various purposes [Zhou, Z., Wang, H., You, Z., "A Method of Designing Developable Origami Structures in Three-Dimensional Space—Part A: Mathematical Foundation" in Proceedings of the ASME 2014 International Design Engineering Technical Conferences & Computers and Information in Engineering Conference, Buffalo, N.Y., Aug. 17-20, 2014. DETC2014-34588; Jin, M., Zhang, X., Zhu, B., "Design of Compliant Mechanisms Using A Pseudo-Rigid-Body Model Based Topology Optimization Method" in Proceedings of the ASME 2014 International Design Engineering Technical Conferences & Computers and Information in Engineering Conference, Buffalo, N.Y., Aug. 17-20, 2014. DETC2014-34325]. Other papers focused on design of origami fold patterns based on a series of constraints. While some origami papers have focused on optimization [Jin, M., Zhang, X., Zhu, B., "Design of Compliant Mechanisms Using A Pseudo-Rigid-Body Model Based Topology Optimization Method" in Proceedings of the ASME 2014 International Design Engineering Technical Conferences & Computers and Information in Engineering Conference, Buffalo, N.Y., Aug. 17-20, 2014. DETC2014-34325; Zhao, K., Schmiedeler, J. P., "Using Rigid-Body Mechanism Topologies to Design Shape-Changing Compliant Mechanisms" in Proceedings of the ASME 2013 International Design Engineering Technical Conferences & Computers and Information in Engineering Conference, Portland, Oreg., Aug. 4-7, 2013. DETC2013-12576] and some on minimizing out-of-plane thickness [Zirbel, S. A., Magleby, S. P., Howell, L. L., Lang, R. J., Thomson, M. W., Sigel, D. A., Walkemeyer, P. E., Trease, B. P., "Accommodating Thickness in Origami-Based Deployable Arrays" in Proceedings of the ASME 2013 International Design Engineering Technical Conferences & Computers and Information in Engineering Conference, Portland, Oreg., Aug. 4-7, 2013. DETC2013-12348], other papers have focused on a variety of considerations when engineering origami, such as crease characterization [Francis, K. C., Rupert, L. T., Lang, R. J., Morgan, D. C., Magleby, S. P., Howell, L. L., "From Crease Patter to Product: Considerations to Engineering Origami-Adapted Designs" in Proceedings of the ASME 2014 International Design Engineering Technical Conferences & Computers and Information in Engineering Conference, Buffalo, N.Y., Aug. 17-20, 2014. DETC-2014-34031].

Generally, a design is discussed herein that combines the strength of solid parts with the waterproof seal and flexibility of a flexible membrane, thus creating a waterproof barrier which could potentially be used to separate fluids in a body of water or otherwise block the path of travel of a fluid. The optimization of the compliant link achieved a reduction of internal stress during operation. This type of device could have applications in the maritime industry for separating a spilled fluid from another fluid such as a body of water, or also in the medical industry to separate a sterile area from a non-sterile area.

Design

For certain embodiments of the current device, the chosen method of making the unit cell waterproof was adding a piece of flexible material or "membrane" with an origami fold pattern between the layers of the unit cell. This piece of material is henceforth referred to as "the membrane." For initial fabrication, the membrane was made out of standard printer paper. The fold pattern was designed so that its kinematics would match the kinematics of the unit cell. A simplified model of the shields (shown in FIG. 6) was used for the origami design, where each triangle represents one shield. It is simplified because this model of the shields does not include the flexure portion of the links (see FIG. 2). In this model, each shield exists on a different level in the z-axis.

The design of the fold pattern was divided into three parts: (1) edges, allowing for compression and expansion of the unit cell; (2) corners, allowing for shearing of the unit cell; and (3) a center piece, providing a contiguous (and hence waterproof) surface and allowing center motion. With a larger-scaled version, it can be envisioned that there would be multiple unit cells, so the membrane would prevent fluid from flowing within any of the unit cells.

Figure 7:
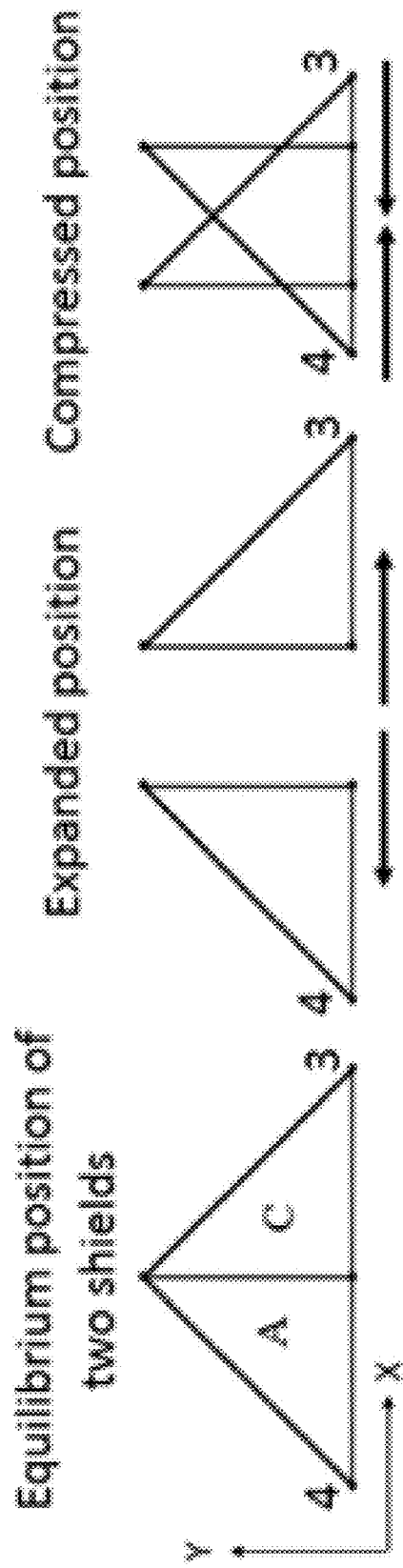
FIG. 7 is a diagram of relative translation between two shields sharing a side, which provides for compression/expansion of the unit cell.

As shown in FIG. 7, two adjacent shields on a side may be either pulled apart in tension, or pushed together in compression. Thus, the origami membrane that connects the two shields on a side should fold in a way that permits this relative translation.

Figure 8:
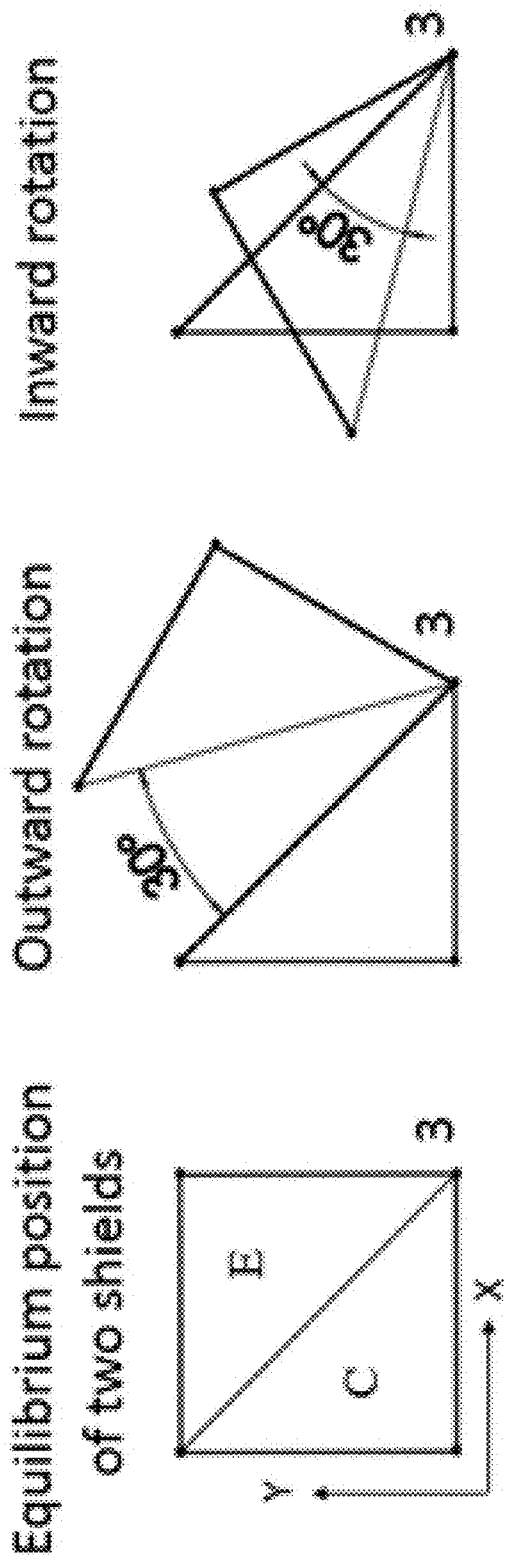
FIG. 8 is a diagram of the rotational motion of two shields.

Rotational motion (shown in FIG. 8) at the corners of the unit cell permits the membrane to shear. The rotations that occur during shear are coupled. For example, now referring back to FIG. 6, if the angle at nodes 2 and 4 become more acute, then the angles at nodes 1 and 3 become more obtuse, and the part of the origami membrane at each of the corners would need to fold in ways that permit both acute and obtuse angles at each corner. Based on the constraints of the unit cell, it was determined that two shields at a node should be able to rotate up to thirty degrees (positive and negative) with respect to one another.

As previously stated, in this example, the unit cell was designed to expand to four-thirds of its original side length, and compress to two-thirds of its original side length. When the original side length was three inches at equilibrium, the portion of the origami membrane that connects two adjacent shields should be one inch. Given that shields connected at a node need to be able to rotate up to thirty degrees (positive or negative) with respect to one another, the portion of the membrane that connects these shields (which originates along the hypotenuses of the triangles) can be thirty degrees wide as well. The design for the portion of the origami membrane that allows compression/expansion (shown in FIG. 7) is the same on each edge of the unit cell.

Figure 9:
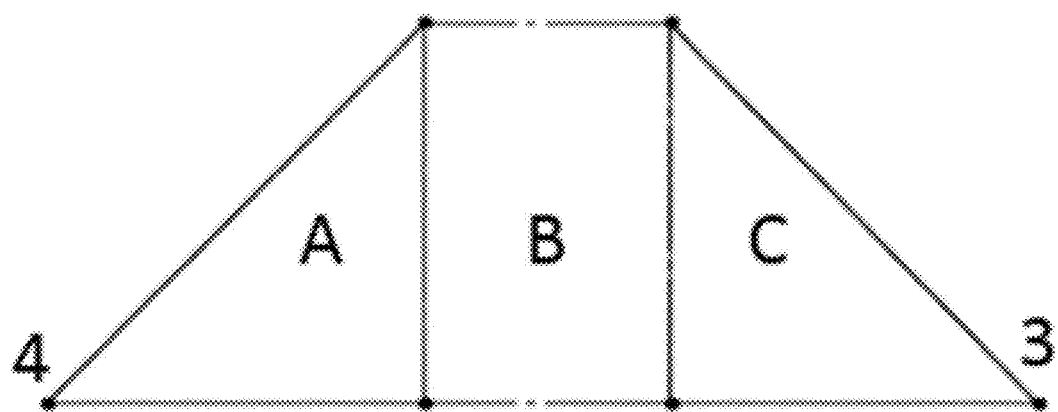
FIG. 9 is a schematic of the edge component of the origami membrane.

FIG. 9 shows the origami membranes that connect the edge components. The triangular membranes (labeled "A" and "C") are the same adjacent shields shown in FIG. 7. A middle membrane (labeled "B") connects the two shields and fills the gap as the shields move relative to one another.

Figure 10:
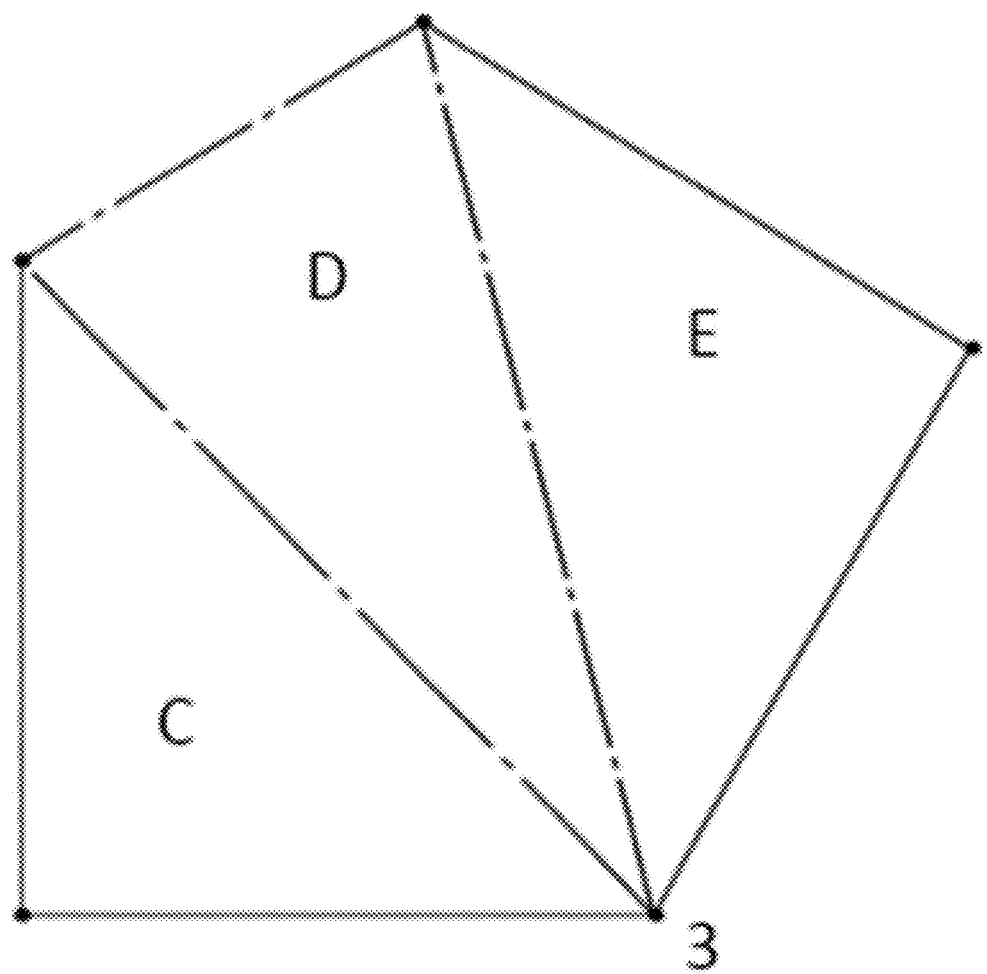
FIG. 10 is a schematic of the corner components of the origami membrane.

FIG. 10 shows the origami membranes that connect the corner components. The right triangles on the left and right (labeled "C" and "E") are the same shields as the respective ones shown in FIG. 8. Node 3 is also the same as in FIG. 8. Membrane D in FIG. 10 is analogous to membrane B in FIG. 9, in that it is the membrane section that fills the gaps between the shields as the corners shear.

Figure 12:
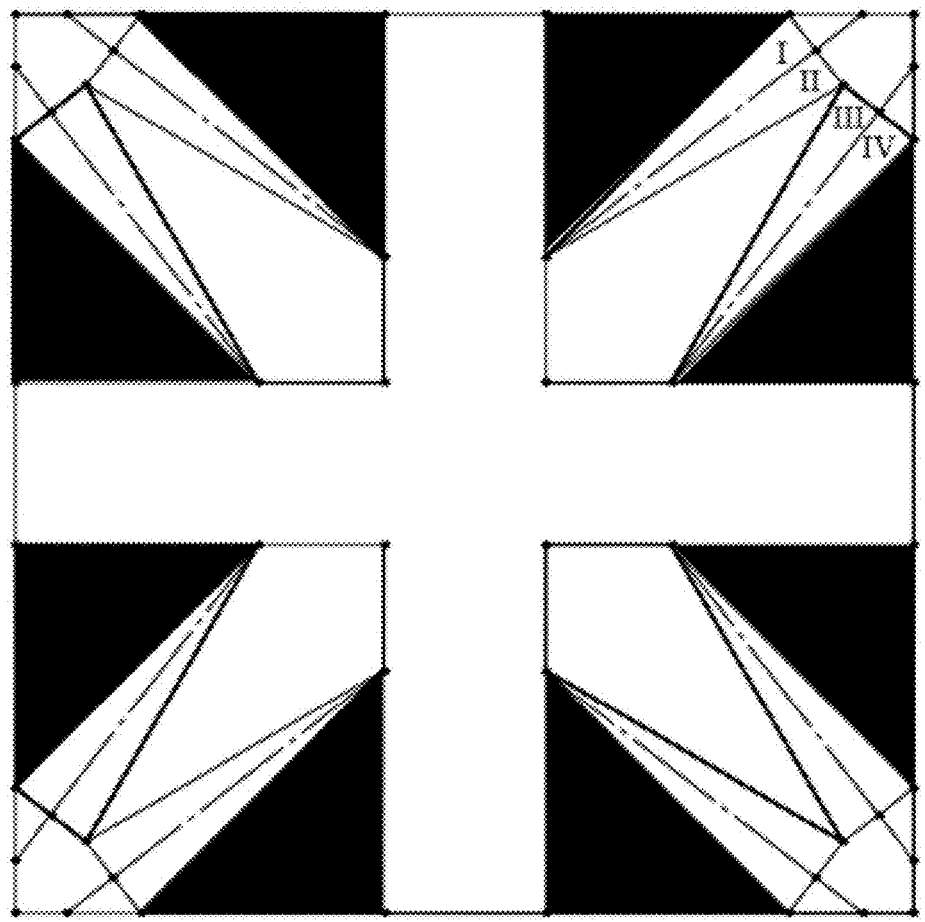
FIG. 12 depicts the perimeter of the origami membrane with fold lines that permit tension/compression and shearing of the unit cell.

The edge and corner components of the origami membrane connect to one another in series around the outside perimeter of the unit cell. These components seal the gaps between the shields and prevent fluid from flowing between them. Since these components are wrapped around the outer edges and corners of the unit cell, they leave a gap in the middle of the unit cell, where fluid may be able to flow. The edge and corner components of the origami design were relatively simple because they are each only concerned with the relative motion of two shields. When four sections, such as four of the component seen in FIG. 9 are arranged in a square to form part of the origami membrane, the schematic shown in FIG. 12 is generated. In FIG. 12, the shield sections (like those labeled C and E in FIG. 10) are shaded black, while the membrane is left white. Four additional triangles (labeled I, II, III, and IV) are added to each corner of the membrane in order to have a geometry that is planar, i.e., capable of being cut from a flat sheet of material.

Figure 11:
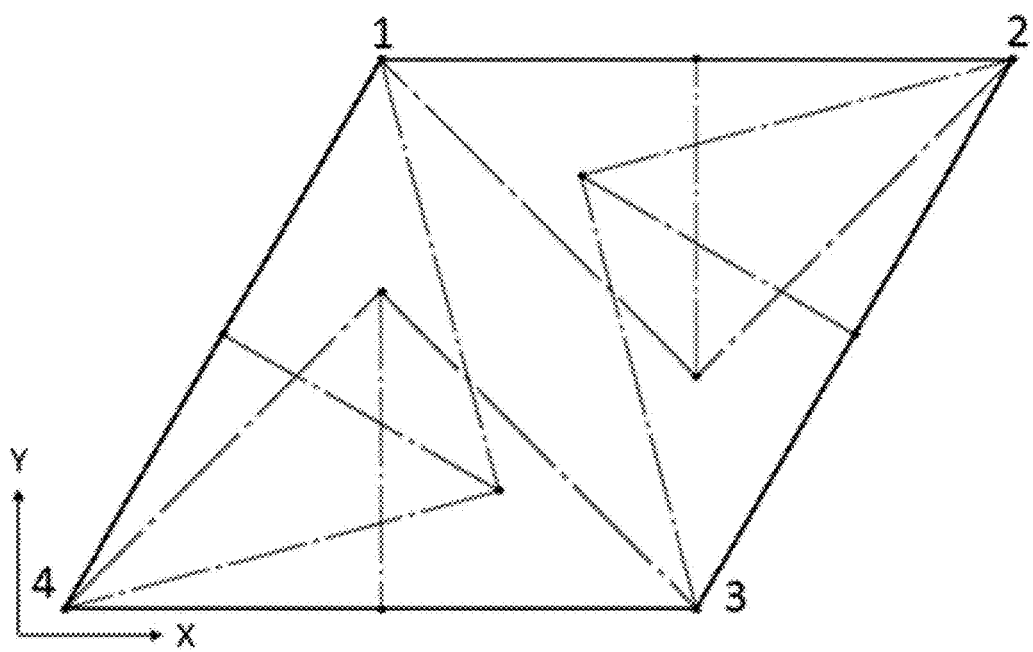
FIG. 11 depicts a unit cell in sheared position, where the broken lines show the positions of the eight shields.

In use, section I would be permanently bonded to section II, and section III would be permanently bonded to section IV, resulting in a corner that looks similar to FIG. 10, with the additional material included (sections I, II, III and IV) becoming flaps folded under the membrane. This forces the originally planar piece of origami to fold out-of-plane, into a bowl-like shape. The membrane is then able to take on a range of positions of the unit cell, including during expansion and compression of the unit cell. Three positions which demonstrate the shear capacity of the membrane are: sheared to the right (shown in FIG. 11), unit cell equilibrium (FIG. 6), and sheared to the left (the mirror image about the Y-axis of FIG. 11). The unit cell equilibrium (where the flexures are unstressed) is the position halfway between the two sheared positions. When the unit cell is in its equilibrium position, the four arms of the star are folded in half about their center axes.

The portion of the origami membrane that resides in the center of the unit cell is a more complex piece. Its complexity comes from the fact that it is concerned with the motion of eight shields. The requirements for the center of the membrane are that it does not interfere with the motion of the edges and that it satisfies the requirement that origami fold patterns be two-colorable. The fold pattern shown in FIG. 13 satisfies these requirements.

Figure 13:
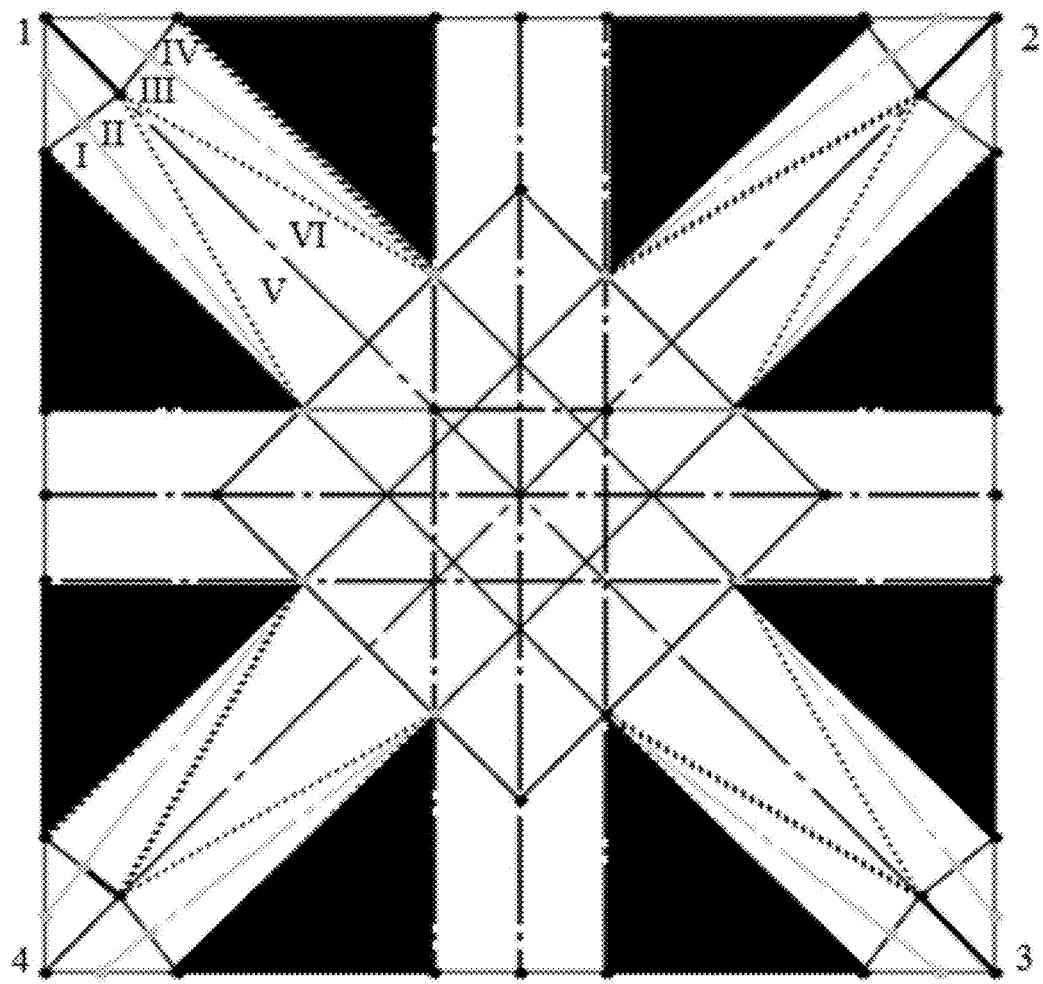
FIG. 13 is a schematic of the center component of the origami membrane.

Appropriate dimensions were determined based on the dimensions of the edge and corner components. The combination of sections V and VI in FIG. 13 is similar to section D in FIG. 10 but in a mirrored orientation, and in this way, sections I and II are similar to membrane C, and sections III and IV are similar to membrane E in FIG. 10. The design of FIG. 13 is essentially four corner pieces (such as the one shown in FIG. 10) connected to four edge pieces (such as the one shown in FIG. 9), with a diamond fold structure in the middle of it.

The three hashed lines that run horizontal and vertical in FIG. 13 are fold lines. The sections which are enclosed by those lines allow the membrane to expand in the X and/or Y-direction(s). The solid lines which form diamonds in the center of the figure are fold lines which allow the membrane to fold into the shear positions.

Figure 6:
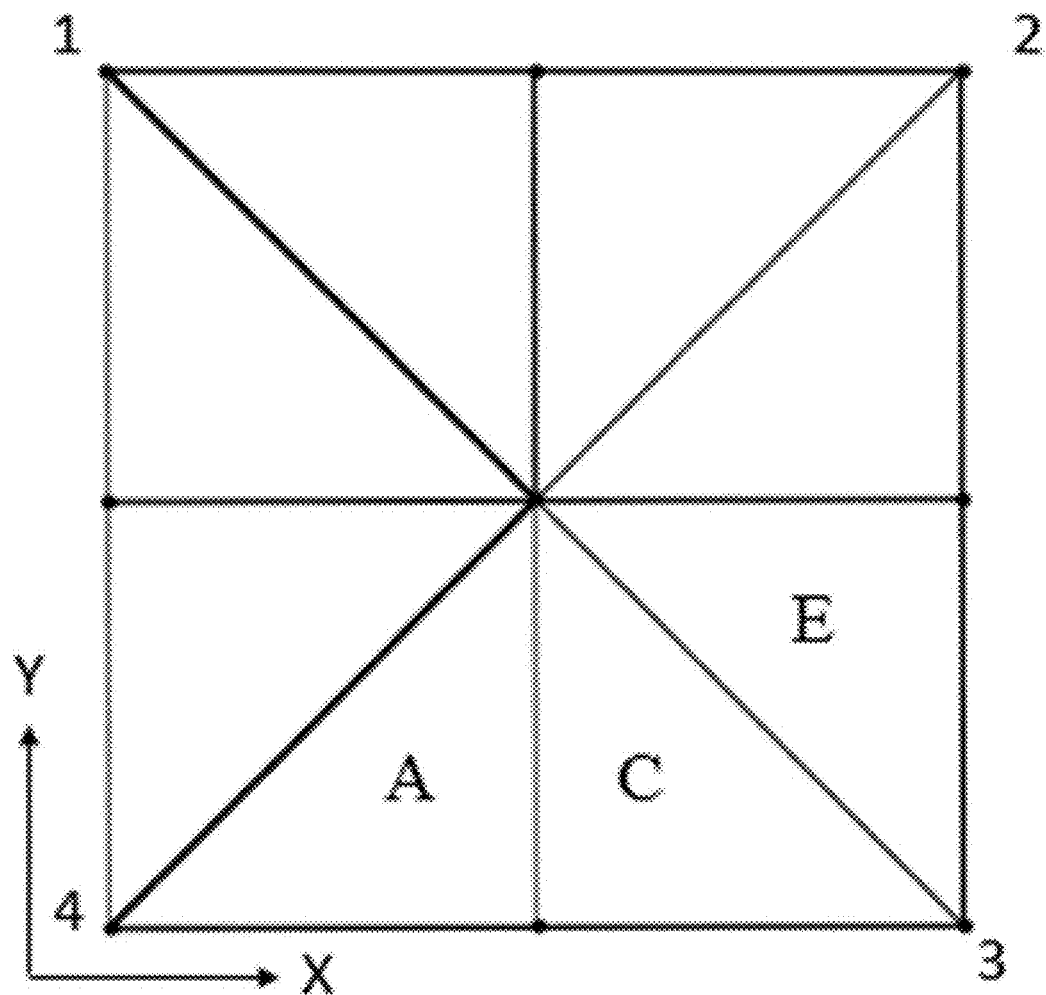
FIG. 6 is a simplified model of the unit cell, with the nodes numbered and certain shields designated with letters.
Figure 14:
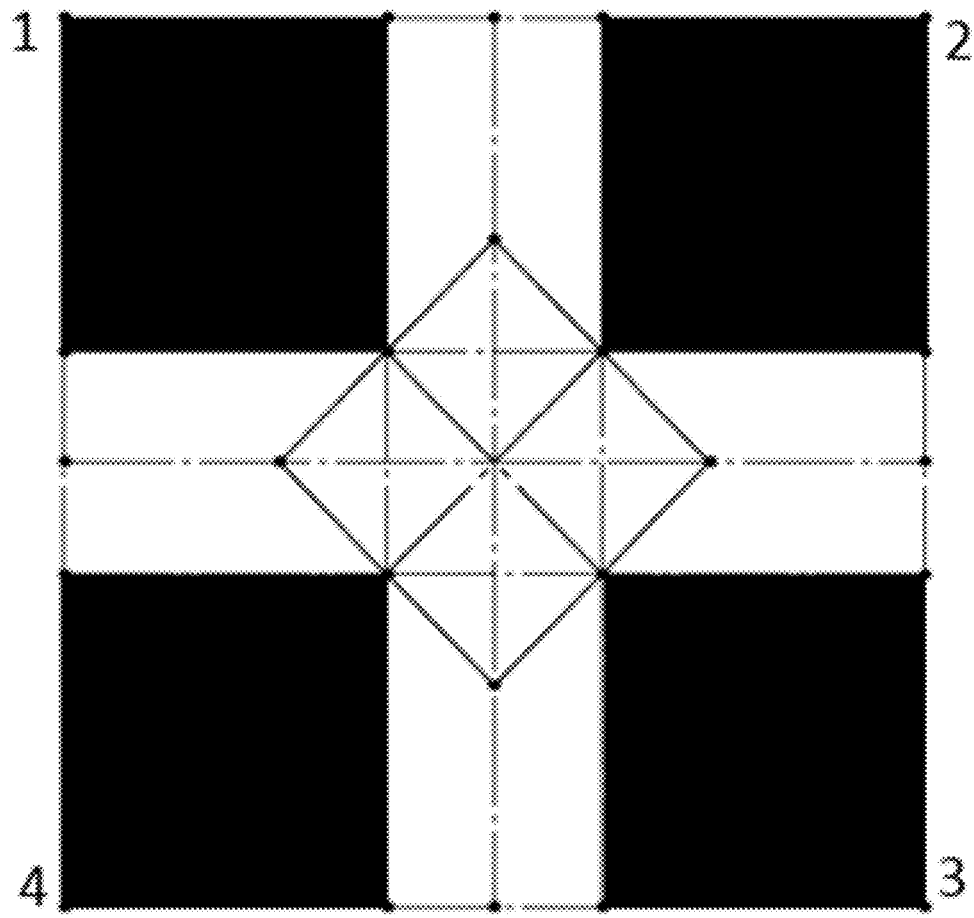
FIG. 14 depicts the border of the origami membrane with the corners collapsed and the edges expanded.

When the corners and edges are all brought together, as they are in the equilibrium position, the membrane would look the same as the equilibrium position shown in FIG. 6. When the corners are brought together but the edges are not, it appears the way it does in FIG. 14. Note that in this context, an expanded position means that the membrane material between two adjacent shields (section B of FIG. 9; see also FIG. 15) is expanded in tension, and a collapsed position means that the edges of two adjacent shields are brought together, and the membrane material between them (section D of FIG. 10) is folded over.

Figure 15:
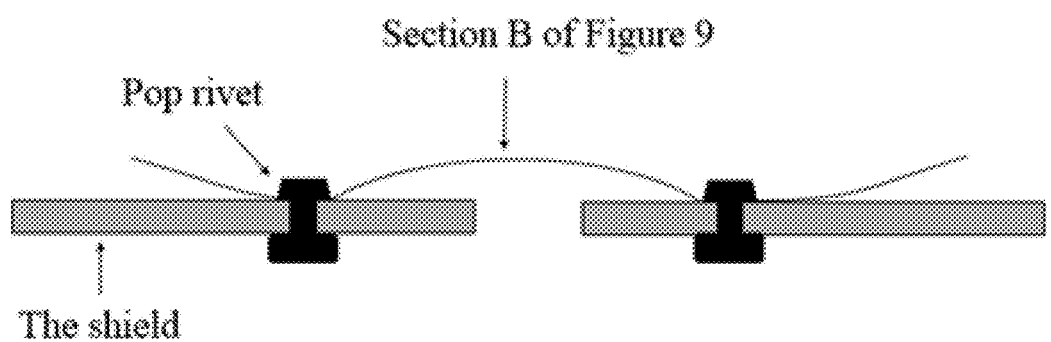
FIG. 15 is a side view of two adjacent shields, showing how the origami membrane mounts to them.

As previously stated, the unit cell is designed to be able to expand or contract in the x- and/or y-direction(s). Part of the integration of the origami membrane was attaching the origami membrane to the unit cell. The chosen method of attaching the membrane to the shields was pop rivets, as can be seen in FIG. 15, though other suitable methodologies are contemplated as well.

Results

Figure 16A:
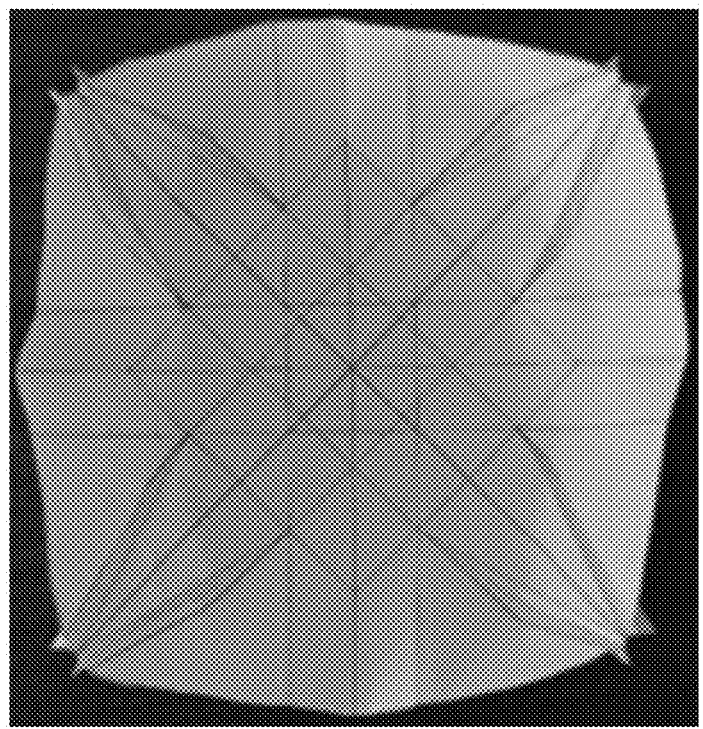
FIG. 16A depicts the origami prototype folded into its equilibrium position.
Figure 16B:
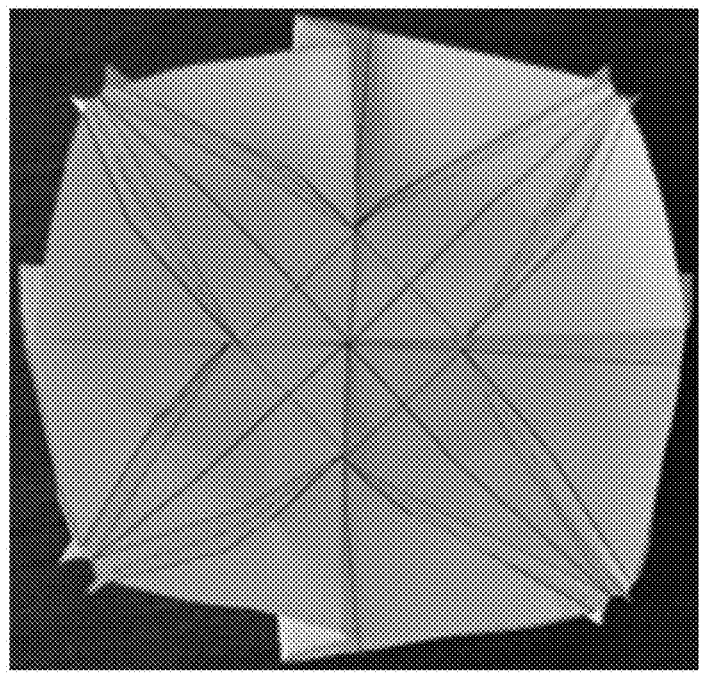
FIG. 16B depicts the origami prototype folded into its compressed position.

FIGS. 16A-16B show the origami membrane with certain sections bound (from FIG. 12, section I bound to section II and section III bound to section IV, as described previously), but all other sections expanded.

Figure 16C:
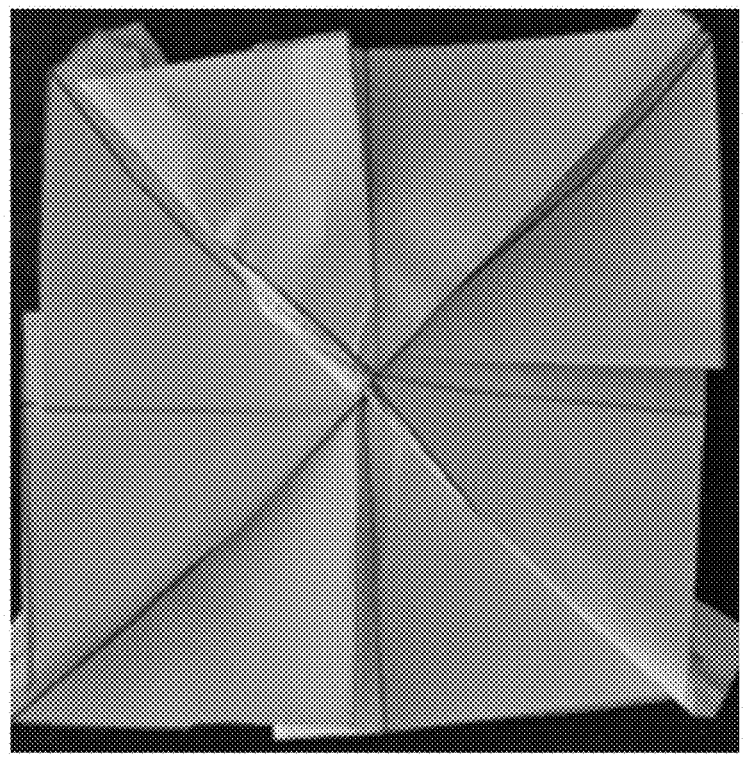
FIG. 16C depicts the origami prototype folded into its fully expanded position.
Figure 16D:
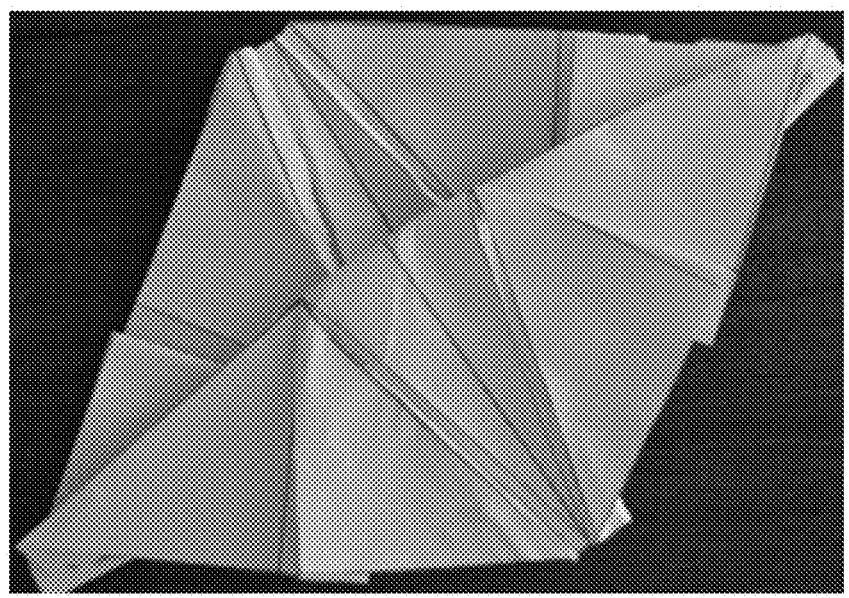
FIG. 16D depicts the origami prototype folded into an expanded shear position. Note that FIGS. 16A-16D correspond to the SSS positions shown in FIGS. 1A-1D.

FIGS. 16A-16D show the origami prototype folded in positions comparable to those shown for the SSS in FIGS. 1A-1D. FIG. 16A shows the origami membrane in its equilibrium position (halfway between the two shear positions). FIG. 16B shows the origami membrane in its fully compressed position. FIG. 16C shows the origami membrane in its fully expanded position (compare also with FIG. 14). FIG. 16D shows the origami membrane in a shear position (compare with FIG. 11).

Figure 17:
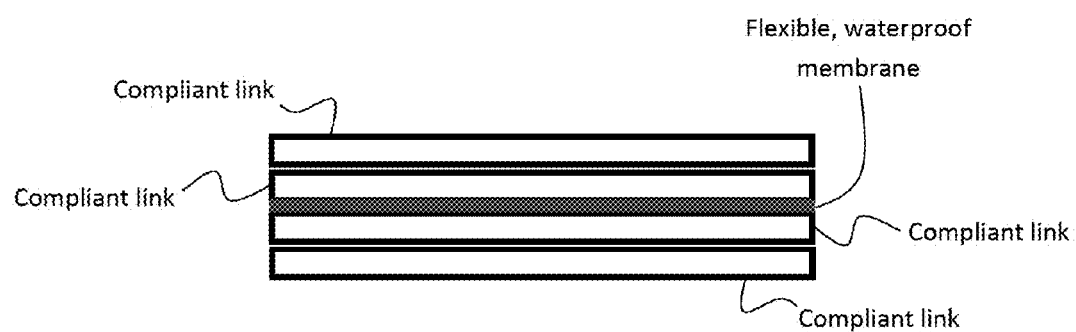
FIG. 17 is a schematic of a cross-section of a unit cell, according to an embodiment of the current invention.

Due to transparency, FIGS. 1A-1D do not clearly depict the flexible membrane. FIG. 17 is a simple schematic of a cross-section of a unit cell having four (4) layers of compliant links and one (1) flexible, waterproof membrane between two layers of the compliant links. It is contemplated herein that only one (1) membrane is needed, though one of ordinary skill in the art could dispose additional membrane between additional layers of links, if desired.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

Glossary of Claim Terms

Adjacent: This term is used herein to refer to two or more structures being disposed next to each other such that they abut or overlap each other.

Compliant link: This term is used herein to refer to a component of a unit cell that is capable of being displaced out of an equilibrium position as a result of an external force being placed on it. In certain embodiments, the compliant link can achieve stability in different positions, while in other embodiments, the compliant link can return to its equilibrium position when the external force is removed.

Contiguous line of sight barrier: This term is used herein to refer to an unbroken obstruction of an observer's vision through an SSS, where the observer's vision is linear through and normal to a surface of the SSS. This obstruction is unbroken regardless of the orientation of the SSS.

Contiguous surface: This term is used herein to refer to a plane that is unbroken regardless of the orientation of the SSS.

Diamond fold: This term is used herein to refer to the bending design of a portion of a structure (membrane) substantially in the shape of a diamond.

Flexible membrane: This term is used herein to refer to a layer disposed over or within an SSS, for obstructing the flow of a liquid or gas through the SSS.

Flexure: This term is used herein to refer to a segment of a compliant link that is capable of being bent as a result of an external force being placed on the compliant link in a direction that permits movement of the compliant link (e.g., expansion, compression, shearing).

Fluid-blocking: This term is used herein to refer to the obstruction of the flow of a liquid or gas by a particular structure.

Layered: This term is used herein to refer to two or more structures being on top of each other or otherwise non-coplanar but substantially parallel to each other.

Origami fold pattern: This term is used herein to refer to a design of a membrane to enable coverage of the membrane during manipulation (expansion, compression, shearing) of the underlying SSS.

Overlapping: This term is used herein to refer to a portion of one structure being disposed over or on top of a portion of another structure.

Perpendicular interwoven folds: This term is used herein to refer to the bending design of a portion of a structure (membrane) substantially in a check-type pattern (a plurality of parallel bends perpendicular to another plurality of parallel bends).

Shape-shifting surface: This term is used herein to refer to a surface that maintains its effectiveness as a physical barrier while changing its shape.

Shield component: This term is used herein to refer to a flat plate segment with an extension (flexure) extending therefrom.

Similar kinematics: This term is used herein to refer to the general motion of two structures matching or otherwise corresponding to each other, such that as one structure moves, the corresponding structure also moves in an analogous manner.

Substantially linearly: This term is used herein to refer to a movement of a structure approximately along a straight line.

Substantially parabolic shape: This term is used herein to refer to a structure having a configuration that resembles a parabola or paraboloid. For example, the compliant flexures seen in FIGS. 2-5 have squared-off edges, but they can still be said to have a "substantially parabolic shape," even without the explicit curvature.

Substantially within a line of action: This term is used herein to refer to a geometric representation of the line through which an external force is applied to a SSS.

Underlaying fold: This term is used herein to refer to the bending of a structure (membrane) underneath itself.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A fluid-blocking, shape-shifting surface, comprising:
at least one unit cell including a plurality of layered, adjacent, overlapping compliant links;
said compliant links each including a shield component and a compliant flexure,
said shield component being a substantially flat plate including a first node therein,
said each compliant flexure including a plurality of links, a plurality of joints, and a second node, wherein said second node has a first position and a second position,
said first position and said second position of said second node being substantially within a line of action, such that said second node travels substantially linearly between said first and second positions,
said compliant links being joined together at said first and second nodes and being pivotal about said first and second nodes,
said shield components of said compliant links forming a contiguous line of sight barrier in said first position and in said second position;
a flexible fluid-blocking membrane disposed between at least two layers of said compliant links within said at least one unit cell, said flexible membrane structured to have similar kinematics as said at least one unit cell during manipulation of said at least one unit cell, said flexible membrane being a barrier to fluid flow normal to a surface of said flexible membrane; and
said flexible membrane including edge segments that are disposed at the edges of said at least one unit cell, corner segments that are disposed at the corners of said at least one unit cell, and a center segment that is disposed between said edge segments and said corner segments,
said edge segments permitting compression and expansion of said at least one unit cell, said corner segments permitting shearing of said at least one unit cell, and said center segment providing a contiguous surface, said corner segments further permitting acute and obtuse angles at each corner of said at least one unit cell.

2. The shape-shifting surface as in claim 1, wherein said manipulation of said at least one unit cell is expansion, compression, and shearing of said at least one unit cell.

3. The shape-shifting surface as in claim 1, wherein
said first node of a first compliant link is coupled to said second node of a second compliant link,
said second node of said first compliant link is coupled to said first node of a third compliant link,
said first node of said second compliant link is coupled to said second node of a fourth compliant link, and
said second node of said third compliant link is coupled to said first node of said fourth compliant link,
such that adjacent compliant links are disposed about 90° relative to each other.

4. The shape-shifting surface as in claim 1, wherein said each flexure has a first end connected to said each shield component and a second end that is a free end.

5. The shape-shifting surface as in claim 4, wherein said second node is disposed in said free end of said each compliant link.

6. The shape-shifting surface as in claim 1, wherein said each compliant flexure has a substantially parabolic shape.

7. The shape-shifting surface as in claim 1, wherein said flexible membrane has an origami fold pattern that facilitates said flexible membrane having similar kinematics to said at least one unit cell.

8. The shape-shifting surface as in claim 7, wherein said origami fold pattern includes underlaying edge folds in said edge segments and underlaying corner folds in said corner segments, such that said underlaying edge folds unfold and fill gaps created during expansion of said at least one unit cell and at least two (2) of said underlaying corner folds unfold and fill gaps during shearing of said at least one unit cell.

9. The shape-shifting surface as in claim 8, wherein said origami fold pattern further includes a diamond fold in said center segment, said diamond fold also including perpendicular interwoven folds therein.

10. The shape-shifting surface as in claim 8, wherein said at least one unit cell can expand up to about four-thirds of its original side length, and said at least one unit cell can compress down to about two-thirds of its original side length, and said at least one unit cell can rotate up to about thirty degrees at a node during shearing.

11. The shape-shifting surface as in claim 1, wherein said edge segments and said corner segments are connected to one another in series around a perimeter of said at least one unit cell, said center segment connected to said edge segments and said corner segments.

12. The shape-shifting surface as in claim 1, further comprising pop rivets disposed through a compliant link of said plurality of compliant links, wherein said flexible membrane is coupled to said compliant link using said pop rivets.

13. A waterproof, shape-shifting surface, comprising:
at least one unit cell including a plurality of layered, adjacent, overlapping compliant links;
said compliant links each including a shield component and a compliant flexure, said each flexure having a first end connected to said each shield component and a second end that is a free end;
said shield component being a substantially flat plate including a first node therein,
said each compliant flexure including a plurality of links, a plurality of joints, and a second node, wherein said second node is disposed in said free end of said each compliant link,
wherein said second node has a first position and a second position, said first position and said second position of said second node being substantially within a line of action, such that said second node travels substantially linearly between said first and second positions,
said each compliant flexure having a substantially parabolic shape,
said shield components of said compliant links being joined at said first and second nodes and being pivotal about said nodes,
said shield components of said compliant links forming a contiguous line of sight barrier in said first position and in said second position,
said first node of a first compliant link is coupled to said second node of a second compliant link,
said second node of said first compliant link is coupled to said first node of a third compliant link,
said first node of said second compliant link is coupled to said second node of a fourth compliant link,
said second node of said third compliant link is coupled to said first node of said fourth compliant link, such that adjacent compliant links are disposed about 90° relative to each other;

a flexible fluid-blocking membrane disposed between at least two layers of said compliant links within said at least one unit cell, said flexible membrane structured to have similar kinematics as said at least one unit cell during manipulation of said at least one unit cell, said flexible membrane being a barrier to fluid flow normal to a surface of said flexible membrane, wherein said manipulation of said at least one unit cell is expansion, compression, and shearing of said at least one unit cell, said flexible membrane including edge segments that are disposed at the edges of said at least one unit cell, corner segments that are disposed at the corners of said at least one unit cell, and a center segment that is disposed between said edge segments and said corner segments, wherein said edge segments and said corner segments are connected to one another in series around a perimeter of said at least one unit cell, said center segment connected to said edge segments and said corner segments, said edge segments permitting compression and expansion of said at least one unit cell, said corner segments permitting shearing of said at least one unit cell, and said center segment providing a contiguous surface, said corner segments further permitting acute and obtuse angles at each corner of said at least one unit cell, wherein said flexible membrane has an origami fold pattern that facilitates said flexible membrane having similar kinematics to said at least one unit cell, wherein said origami fold pattern includes underlaying edge folds in said edge segments and underlaying corner folds in said corner segments, such that said underlaying edge folds unfold and fill gaps created during expansion of said at least one unit cell and at least two (2) of said underlaying corner folds unfold and fill gaps during shearing of said at least one unit cell, wherein said origami fold pattern further includes a diamond fold in said center segment, said diamond fold also including perpendicular interwoven folds therein, wherein said at least one unit cell can expand up to about four-thirds of its original side length, and said at least one unit cell can compress down to about two-thirds of its original side length, and said at least one unit cell can rotate up to about thirty degrees at a node during shearing; and pop rivets disposed through a compliant link of said plurality of compliant links, wherein said flexible membrane is coupled to said compliant link using said pop rivets.

14. A shape-shifting polyhedron, comprising:

a polygonal cell including a plurality of unit cells;

said plurality of unit cells each including layered, adjacent, overlapping compliant links coupled to retain their effectiveness as physical barriers while undergoing changes in shape, said compliant links each including a shield component and a compliant flexure, said shield component being a substantially flat plate including a first node therein, said changes in shape including expansion, shearing, shrinkage, twisting, vibrating, encircling, wiggling, swallowing or constricting, said each compliant flexure including a plurality of links, a plurality of joints, and a second node, wherein said second node has a first position and a second position, said first position and said second position of said second node being substantially within a line of action, such that said second node travels substantially linearly between said first and second positions, said shield components of said compliant links being joined at said first and second nodes and being pivotal about said nodes, said shield components forming a contiguous line of sight barrier in said first position and in said second position; and a flexible fluid-blocking membrane disposed between at least two layers of said compliant links within said each unit cell, said flexible membrane structured to have similar kinematics as said each unit cell during manipulation of said each unit cell, said flexible membrane being a barrier to fluid flow normal to a surface of said flexible membrane;

said flexible membrane including edge segments that are disposed at the edges of said each unit cell, corner segments that are disposed at the corners of said each unit cell, and a center segment that is disposed between said edge segments and said corner segments, said edge segments permitting compression and expansion of said each unit cell, said corner segments permitting shearing of said each unit cell, and said center segment providing a contiguous surface, said corner segments further permitting acute and obtuse angles at each corner of said each unit cell, wherein said edge segments and said corner segments are connected to one another in series around a perimeter of said each unit cell, said center segment connected to said edge segments and said corner segments.

15. The shape-shifting surface as in claim 14, wherein said flexible membrane has an origami fold pattern that facilitates said flexible membrane having similar kinematics to said each unit cell.

16. The shape-shifting surface as in claim 15, wherein said origami fold pattern includes underlaying edge folds in said edge segments and underlaying corner folds in said corner segments, such that said underlaying edge folds unfold and fill gaps created during expansion of said each unit cell and at least two (2) of said underlaying corner folds unfold and fill gaps during shearing of said each unit cell.

17. The shape-shifting surface as in claim 16, wherein said origami fold pattern further includes a diamond fold in said center segment, said diamond fold also including perpendicular interwoven folds therein.

18. The shape-shifting surface as in claim 14, further comprising pop rivets disposed through a compliant link of said plurality of compliant links, wherein said flexible membrane is coupled to said compliant link using said pop rivets.

* * * * *